(12) United States Patent
Ookuma

(10) Patent No.: US 7,265,863 B2
(45) Date of Patent: Sep. 4, 2007

(54) IMAGE FORMING SYSTEM, IMAGE FORMING DEVICE, FUNCTION SETTING METHOD AND STORAGE MEDIUM

(75) Inventor: Satoshi Ookuma, Ohta-ku (JP)

(73) Assignee: Canon Kabushiki Kaisha (JP)

( * ) Notice: Subject to any disclaimer, the term of this patent is extended or adjusted under 35 U.S.C. 154(b) by 141 days.

(21) Appl. No.: 11/189,207

(22) Filed: Jul. 26, 2005

(65) Prior Publication Data

US 2005/0270557 A1  Dec. 8, 2005

Related U.S. Application Data

(63) Continuation of application No. 09/599,823, filed on Jun. 22, 2000, now Pat. No. 6,977,735.

(30) Foreign Application Priority Data

Jun. 25, 1999 (JP) ................................ 11-180134

(51) Int. Cl.
*G06F 3/12* (2006.01)
*G06K 15/00* (2006.01)

(52) U.S. Cl. .................... 358/1.15; 358/1.14; 358/1.13

(58) Field of Classification Search ............... 358/1.15, 358/1.14, 1.13, 1.1, 1.6, 1.16, 1.17, 1.18, 358/407, 468, 442; 347/2, 3, 5; 715/700, 715/733, 738, 739
See application file for complete search history.

(56) References Cited

U.S. PATENT DOCUMENTS

| 6,133,844 | A | 10/2000 | Ahne et al. |
| 6,134,019 | A * | 10/2000 | Wantuck et al. ............ 358/1.15 |
| 6,447,184 | B2 * | 9/2002 | Kimura et al. .............. 400/578 |
| 7,139,085 | B1 * | 11/2006 | Sakaguchi ................. 358/1.15 |
| 2001/0052995 | A1 * | 12/2001 | Idehara ...................... 358/1.15 |
| 2004/0057743 | A1 | 3/2004 | McIntyre |

FOREIGN PATENT DOCUMENTS

| JP | 01232634 A * | 9/1989 |
| JP | 7-123224 A | 5/1995 |
| JP | 2000293336 A * | 10/2000 |

\* cited by examiner

*Primary Examiner*—Dov Popovici
(74) *Attorney, Agent, or Firm*—Rossi, Kimms & McDowell LLP

(57) ABSTRACT

An image forming system includes a plurality of image forming devices each having a reading unit that can read an image. The image forming devices are connectable to one another through communication media. One of the image forming devices can be used to read an image and at least another one of the image forming devices can be selected as a destination device for forming the image read by the one image forming device.

26 Claims, 25 Drawing Sheets

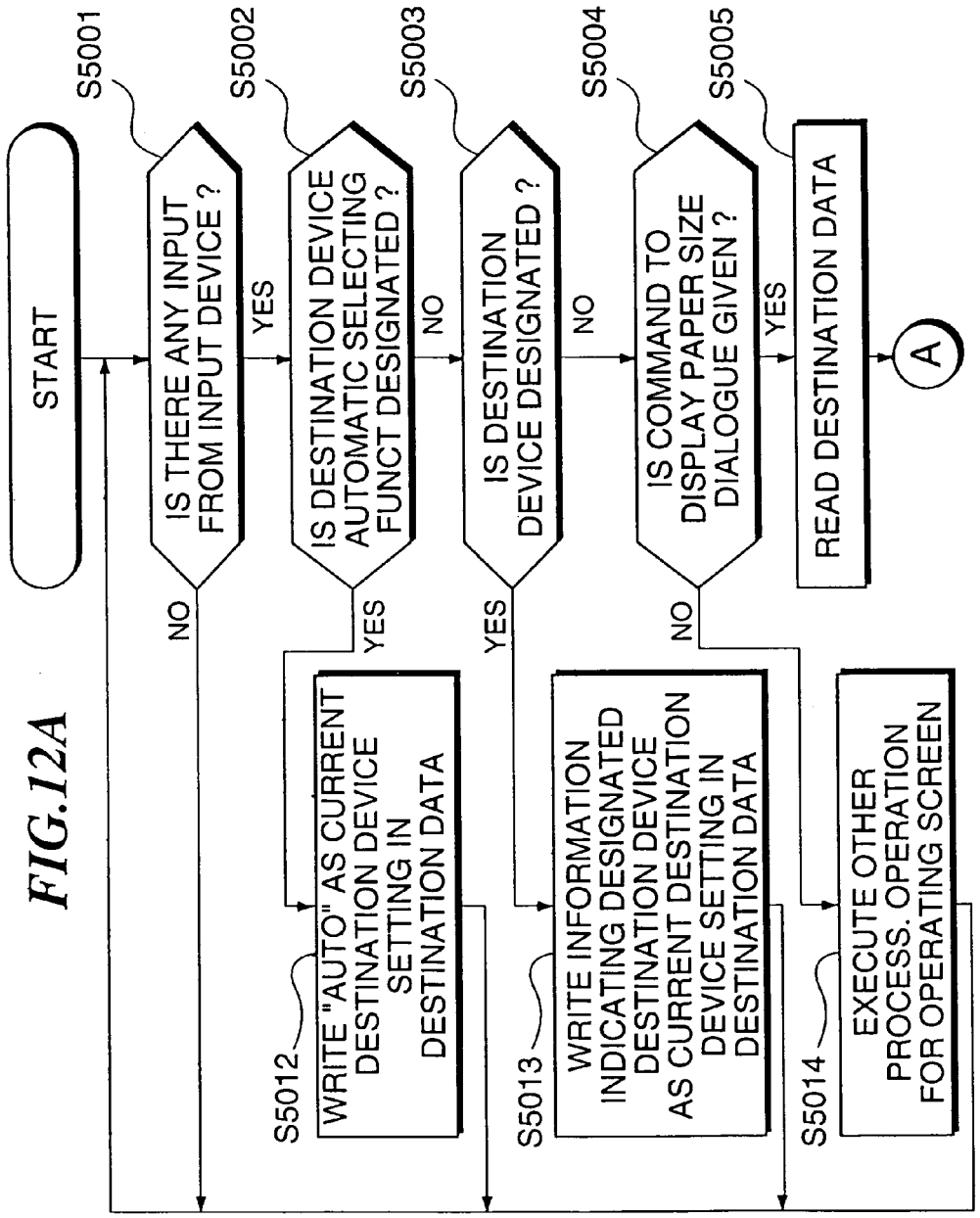

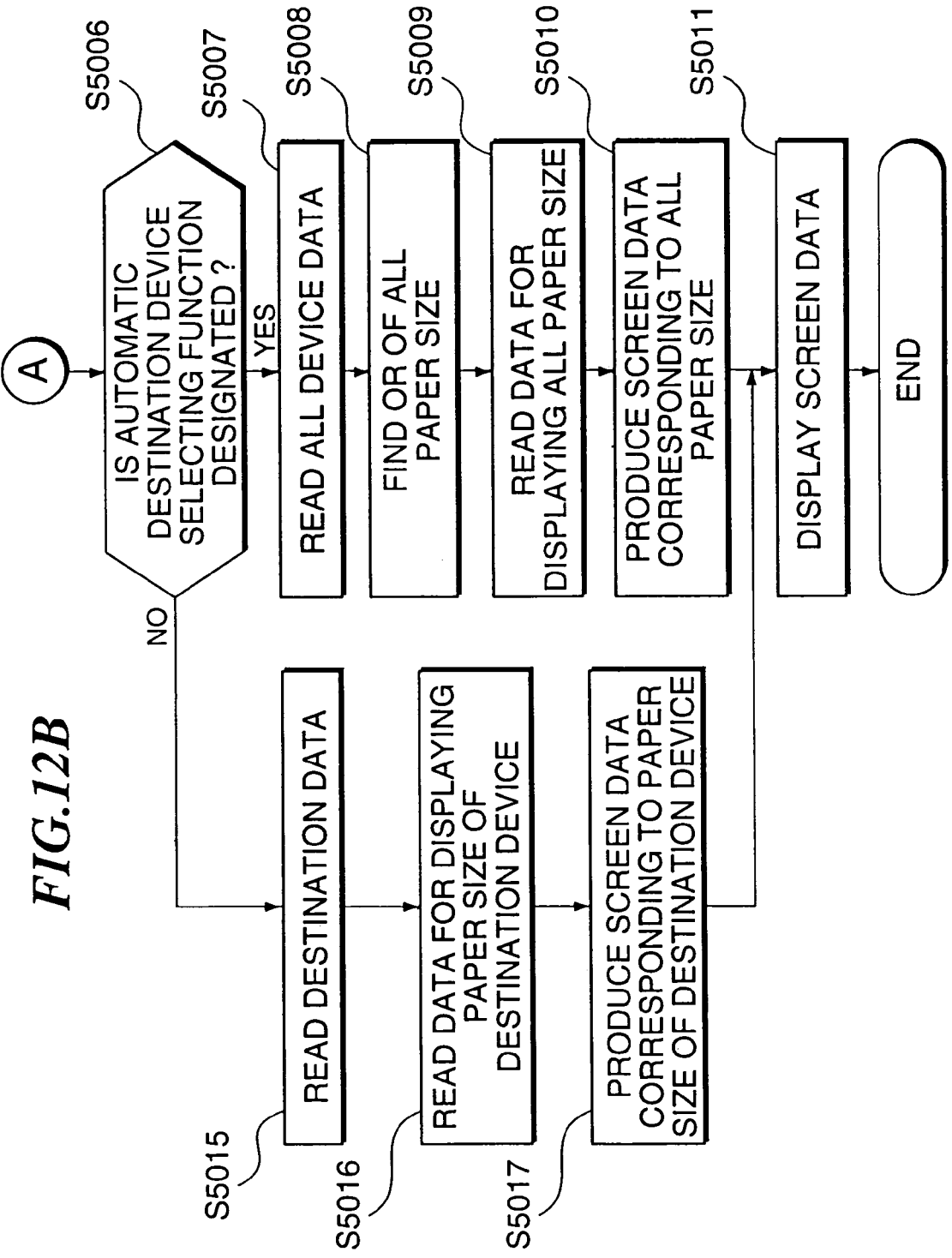

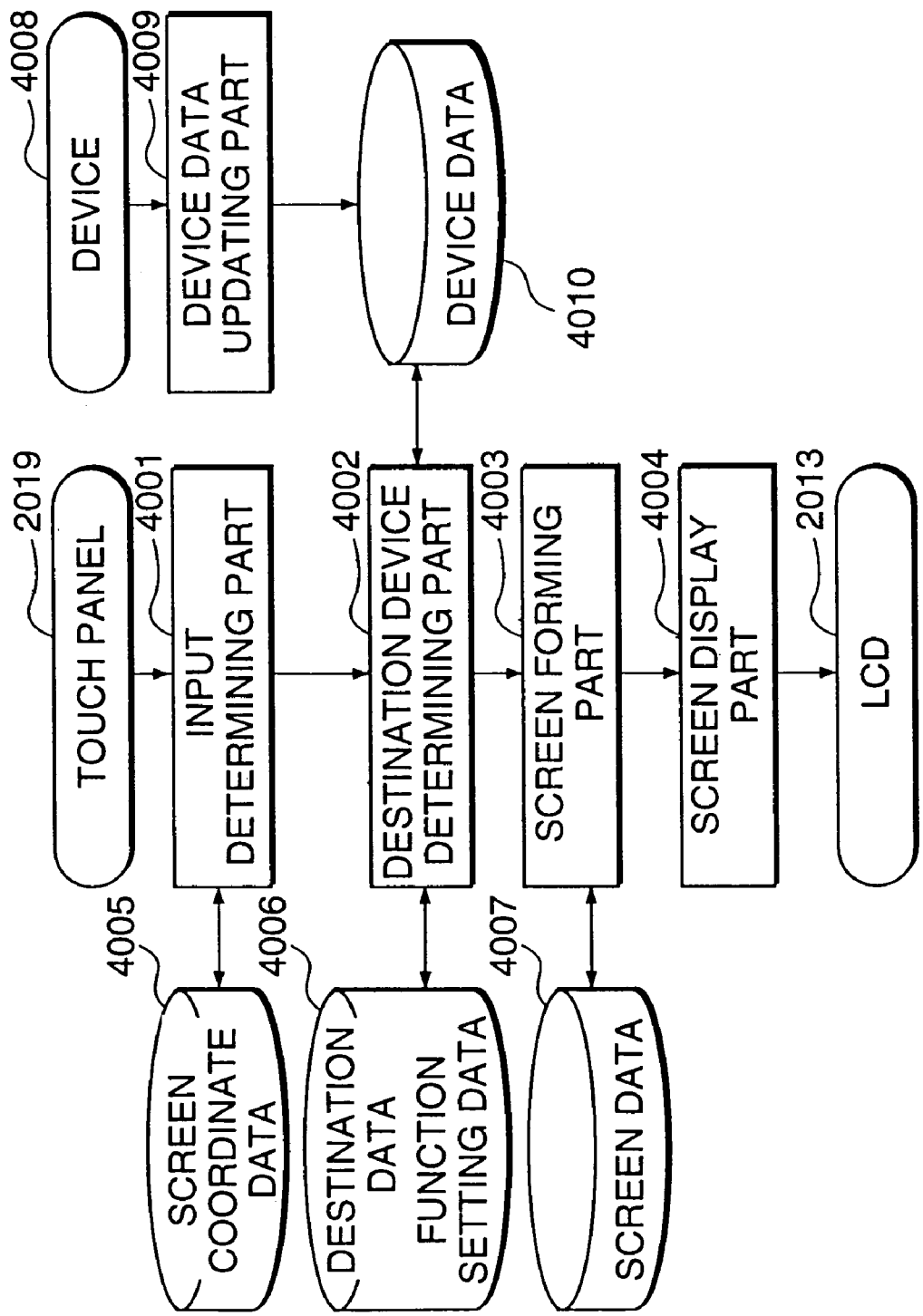

IMAGE FORMING SYSTEM, IMAGE FORMING DEVICE, FUNCTION SETTING METHOD AND STORAGE MEDIUM

CROSS REFERENCE TO RELATED APPLICATION

This application is a continuation of U.S. patent application Ser. No. 09/599,823 filed on Jun. 22, 2000 now U.S. Pat No. 6,977,735.

BACKGROUND OF THE INVENTION

1. Field of the Invention

The present invention relates to an image forming system wherein a plurality of image forming devices having a plurality of functions relating to image formation are connected to one another through communication media, the image forming devices, a function setting method and a storage medium.

2. Description of Related Art

An image input means comprised of a scanner and an image output means comprised of a printer are ordinarily integrated in image forming devices. In some image forming systems using such image forming devices, a plurality of image forming devices are connected to one another through communication media. In such systems, an image output means of an image forming device forms an image inputted from an image input means of another image forming device, or transfers an image inputted from an image input means of another image forming device to an image output means of still another image forming device through the communication media.

The image forming devices in such image forming systems have a variety of functions relating to image formation such as a printing method, and have an operation command input means for giving commands to set these functions, a display means for displaying values of the functions set by the operation command input means, and so forth. In each of the image forming devices (hereinafter referred to as "the present image forming device), the functions relating to image formation can be set in an individual destination device selecting mode for arbitrarily selecting a destination device, which is able to execute a desired function for an image inputted from an image input means of the present image forming device among the present image forming device and the other image forming devices connected to the present image forming device through the communication media, and in an automatic destination device selecting mode for automatically selecting a destination device, which is able to execute a desired function for an image inputted from an image input means of the present image forming device among the present image forming device and the other image forming devices connected to the present image forming device through the communication media.

If the functions are set in the individual destination device selecting mode, information indicating each image forming device and information indicating corresponding functions that can be executed by the indicated image forming device are displayed on an information input screen. An image forming device that is able to execute a desired function is selected as the destination device by an inputting operation of designating the image forming device as the destination device on the information input screen, and the selected image forming device executes the desired function.

If the functions are set in the automatic destination device selecting mode, function information indicating all functions that can be executed respectively by the image forming devices is displayed, and an image forming device that is able to execute a desired function can be selected automatically by an inputting operation with reference to information representing the desired function in the function information.

In the system that is capable of setting the functions relating to the image formation in the individual destination device selecting mode or in the automatic destination device selecting mode, however, the information indicating each image forming device and the corresponding information indicating all the functions that can be executed by the indicated image forming device are displayed on a function setting screen of the information input screen when the functions are set in the individual destination device selecting mode. Thus, a large amount of function information is displayed on the function setting screen, and it is, therefore, necessary to designate an image forming device from a large amount of information displayed on the function setting screen, and to designate a desired function from the functions of the designated image forming device.

When the functions are set in the automatic destination device selecting mode, the information indicating all the functions that can be executed by the image forming devices is displayed on the function setting screen. If many image forming devices are connected through the communication media, the function setting screen displays a large amount of function information. It is necessary to designate information indicating a desired function from such a large amount of function information.

Thus, the function setting screen displays a large amount of information in both destination device selecting modes, and this deteriorates the operability in setting the functions and causes errors in setting the functions.

SUMMARY OF THE INVENTION

It is a first object of the present invention to provide an image forming system, image forming devices, a function setting method, which are capable of greatly enhancing the operability in setting functions relating to image formation in the individual destination device selecting mode and in the automatic destination device selecting mode, and a storage medium storing a program for executing the function setting method.

It is a second object of the present invention to provide an image forming system, image forming devices, a function setting method, which are capable of greatly enhancing the operability in setting functions relating to image formation in the automatic destination device selecting mode, and a storage medium storing a program for executing the function setting method.

To attain the first object, the present invention provides an image forming system which has a plurality of functions relating to image formation and includes a plurality of image forming devices connected through communication media, and wherein an image forming device is selected from the plurality of image forming devices as a destination device for formation of an image inputted from one of the plurality of image forming devices, the image forming system comprising display means for displaying an information input screen for setting functions relating to the image formation, function setting input means for inputting information relating to setting of the functions on the information input screen, function information acquiring means for acquiring function information representing a plurality of functions relating to the image formation from the image forming devices, destination device selecting mode designating means for designating one of an automatic destination device selecting mode for automatically selecting an image forming device as a destination device among the plurality of image forming devices and an individual destination device selecting mode for arbitrarily selecting an image forming device as the destination device, and display control means for controlling display of information about the functions relating to the image formation on the information input screen according to the designated destination device selecting mode and the acquired function information.

According to the above construction, the operability in setting functions relating to image formation in the individual destination device selecting mode and in the automatic destination device selecting mode can be greatly enhanced.

Preferably, in the image forming system, if the individual destination device selecting mode is designated, the display control means controls the display means in such a manner as to display, on the display means, an individual destination device selecting screen for selecting an image forming device as the destination device among the image forming devices, whereby an image forming device is selected as the destination device according to inputting operation on the individual destination device selecting screen.

Preferably, in the image forming system, if the automatic destination device selecting mode is designated, the display control means finds logical sums of functions relating to the image formation of the image forming devices with reference to the acquired function information and controls the display means in such a manner as to display, on the information input screen, function information relating to the functions relating to the image formation, the function information being acquired from the found logical sums. With this construction, functions which can be set in the automatic destination device selecting mode can be easily recognized, and an input operation of setting the functions can be easily performed.

Also preferably, in the image forming system, if the individual destination device selecting mode is designated, the display control means controls the display means in such a manner as to display, on the information input screen, only function information representing functions relating to the image formation of the image forming device selected according to the individual destination device selecting mode with reference to the acquired function information. With this construction, functions which can be set on the individual destination device selecting mode can be easily recognized, and an input operation of setting the functions can be easily performed.

To attain the first object, the present invention provides an image forming device having a plurality of functions relating to image formation and being capable of selecting other image forming devices connected to the image forming device through communication media, as a destination device for an inputted image, the image forming device comprising display means for displaying an information input screen for setting functions relating to the image formation, function setting input means for performing an inputting operation relating to setting of the functions on the information input screen, function information acquiring means for acquiring function information indicating functions relating to the image formation from the image forming device and the other image forming devices, mode designating means for designating a destination device selecting mode between an automatic destination device selecting mode for automatically selecting a destination device image forming device from the image forming device and the other image forming devices and an individual destination device selecting mode for arbitrarily selecting the destination device image forming device, and display control means for controlling display of information about the functions relating to the image formation on the information input screen according to the designated destination device selecting mode and the acquired function information.

According to the above construction, the operability in setting functions relating to image formation in the individual destination device selecting mode and in the automatic destination device selecting mode can be greatly enhanced.

Preferably, in the image forming device, if the individual destination device selecting mode is designated, the display control means controls the display means in such a manner as to display an individual destination device selecting screen for selecting an image forming device as the destination device among the image forming device and the other image forming devices on the display means, whereby an image forming device is selected as the destination device according to inputting operation on the individual destination device selecting screen.

Preferably, in the image forming device, if the automatic destination device selecting mode is designated, the display control means finds logical sums of functions relating to the image formation of the image forming devices with reference to the acquired function information and controls the display means in such a manner as to display function information relating to the functions relating to the image formation, the function information being acquired from the found logical sums. With this construction, functions which can be set in the automatic destination device selecting mode can be easily recognized, and an input operation of setting the functions can be easily performed.

Also preferably, in the image forming device, if the individual destination device selecting mode is designated, the display control means controls the display means in such a manner as to display, on the information input screen, only function information representing the functions relating to the image formation of the image forming device selected according to the individual destination device selecting mode with reference to the acquired function information. With this construction, functions which can be set in the individual destination device selecting mode can be easily recognized, and an input operation of setting the functions can be easily performed.

To attain the first object, the present invention provides a function setting method of setting functions of an image forming system including a plurality of image forming devices having a plurality of functions relating to image formation and being connected to one another through communication media, the image forming system being capable of selecting an image forming device from the plurality of image forming devices as a destination device for forming an image inputted from one of the image forming devices, the method comprising the steps of acquiring function information indicating a plurality of functions relating to the image formation from the image forming devices, displaying an information input screen for setting the functions on display means, designating one of an automatic destination device selecting mode for automatically selecting a destination device image forming device among the image output devices and an individual destination device selecting mode for arbitrarily selecting an image forming device as the destination device, controlling display of information about the functions relating to the image formation on the information input screen according to the designated destination device selecting mode and the acquired function information, and performing an inputting operation relating to setting of the functions on the information input screen.

According to the above construction, the operability in setting functions relating to image formation in the individual destination device selecting mode and in the automatic destination device selecting mode can be greatly enhanced.

Preferably, in the function setting method, if the individual destination device selecting mode is designated, the display means is controlled in such a manner as to display an individual destination device selecting screen for selecting an image forming device as the destination device among the image forming device on the display means, whereby an image forming device is selected as the destination device according to the inputting operation on the individual destination device selecting screen.

Preferably, in the function setting method, if the automatic destination device selecting mode is designated, logical sums of functions relating to the image formation of the image forming devices are found with reference to the acquired function information and the display means is controlled in such a manner as to display, on the information input screen, function information relating to the functions relating to the image formation, the function information being acquired from the found logical sums. With this construction, functions which can be set in the automatic destination device selecting mode can be easily recognized, and an input operation of setting the functions can be easily performed.

Also preferably, in the function setting method, if the individual destination device selecting mode is designated, the display means is controlled in such a manner as to display, on the information input screen, only function information representing the functions relating to the image formation of the image forming device selected according to the individual destination device selecting mode with reference to the acquired function information. With this construction, functions which can be set in the individual destination device selecting mode can be easily recognized, and an input operation of setting the functions can be easily performed.

To attain the first object, the present invention provides a storage medium that can be read by a computer containing a program for setting functions on an image forming system, which has a plurality of functions relating to image formation and includes a plurality of image forming devices connected through communication media, and wherein an image forming device is selected from the image forming devices as a destination device for formation of an image inputted from one of the plurality of image forming devices, the program comprising a function setting input module for displaying an information input screen for setting functions relating to the image formation on display means and performing an inputting operation relating to setting of the functions on the information input screen, a function information acquiring module for acquiring function information representing a plurality of functions relating to the image formation from the plurality of image forming devices, a selecting mode designating module for designating an automatic destination device selecting mode for automatically selecting an image forming device as a destination device among the plurality of image forming devices or an individual destination device selecting mode for arbitrarily selecting an image forming device as the destination device, and a display control module for controlling display of information about the functions relating to the image formation on the information input screen according to the designated destination device selecting mode and the acquired function information.

According to the above construction, the operability in setting functions relating to image formation in the individual destination device selecting mode and in the automatic destination device selecting mode can be greatly enhanced.

Preferably, in the storage medium, if the individual destination device selecting mode is designated, the display control module controls the display means in such a manner as to display, on the display means, an individual destination device selecting screen for selecting an image forming device as the destination device among the plurality of image forming devices, whereby an image forming device is selected as the destination device according to inputting operation on the individual destination device selecting screen.

Preferably, in the storage medium, if the automatic destination device selecting mode is designated, the display control module finds logical sums of functions relating to the image formation of the image forming devices with reference to the acquired function information and controls the display means in such a manner as to display, on the information input screen, function information about the functions relating to the image formation, the function information being acquired from the found logical sums. With this construction, functions which can be set in the automatic destination device selecting mode can be easily recognized, and an input operation of setting the functions can be easily performed.

Also preferably, in the storage medium, if the individual destination device selecting mode is designated, the display control module controls the display means in such a manner as to display, on the information input screen, only function information representing functions relating to the image formation of the image forming device selected according to the individual destination device selecting mode with reference to the acquired function information. With this construction, functions which can be set in the individual destination device selecting mode can be easily recognized, and an input operation of setting the functions can be easily performed.

To attain the second object, the present invention provides an image forming system which has a plurality of functions relating to image formation and includes a plurality of image forming devices connected through communication media, and wherein an image forming device is selected from the plurality of image forming devices as a destination device for formation of an image inputted from one of the plurality of image forming devices, the image forming system comprising display means for displaying an information input screen for setting functions relating to the image formation, function setting input means for inputting information relating to setting of the functions on the information input screen, function information acquiring means for acquiring function information representing a plurality of functions relating to the image formation from the image forming devices, selecting mode designating means for designating an automatic destination device selecting mode for automatically selecting an image forming device as a destination device among the image forming devices, and control means for selecting an image forming device, which is able to execute a function set on the information input screen, as the destination device according to the acquired function information and displaying information about the selected image forming device on the information input screen, if the automatic destination device selecting mode is designated.

According to the above construction, the operability in setting functions relating to image formation in the automatic destination device selecting mode can be greatly enhanced.

Preferably, in the image forming system, if the automatic destination device is designated, the control means is operable whenever a function is set on the information input screen, to select an image forming device, which is able to execute the set function.

Preferably, the image forming system further comprises priority information storing means for storing priority information with respect to the image forming devices, and wherein the control means selects an image forming device, which is able to execute a function set on the information input screen, according to the acquired function information with reference to the priority information if the automatic destination device selecting mode is designated.

Also preferably, in the image forming system, the information relating to the selected image forming device includes information indicating all functions that can be executed by the selected image forming devices.

To attain the second object, the present invention provides an image forming device having a plurality of functions relating to image formation and being capable of selecting other image forming devices connected to the image forming device through communication media, as a destination device for an inputted image, the image forming device comprising display means for displaying an information input screen for setting functions relating to the image formation, function setting input means for performing an inputting operation relating to setting of the functions on the information input screen, function information acquiring means for acquiring function information indicating functions relating to the image formation from the image forming device and the other image forming devices, mode designating means for designating an automatic destination device selecting mode for automatically selecting an image forming device as a destination device from the image forming device and the other image forming devices, and control means for selecting an image forming device, which is able to execute a function set on the information input screen, as the destination device according to the acquired function information and displaying information about the selected image forming device on the information input screen, if the automatic destination device selecting mode is designated.

According to the above construction, the operability in setting functions relating to image formation in the automatic destination device selecting mode can be greatly enhanced.

Preferably, in the image forming device, if the automatic destination device is designated, the control means is operable whenever a function is set on the information input screen, to select an image forming device, which is able to execute the set function.

Preferably, the image forming device further comprises priority information storing means for storing priority information with respect to the image forming devices, and wherein the control means selects an image forming device, which is able to execute a function set on the information input screen, according to the acquired priority information if the automatic destination device selecting mode is designated.

Also preferably, in the image forming device, the information relating to the selected image forming device includes information indicating all functions that can be executed by the selected image forming device.

To attain the second object, the present invention provides a function setting method of setting functions of an image forming system including a plurality of image forming devices having a plurality of functions relating to image formation and being connected to one another through communication media, the image forming system being capable of selecting an image forming device from the plurality of image forming devices as a destination device for forming an image inputted from one of the image forming devices, the method comprising the steps of acquiring function information indicating a plurality of functions relating to the image formation from the image forming devices, displaying an information input screen for setting the functions on display means, and setting the functions, designating an automatic destination device selecting mode for automatically selecting a destination image forming device from the plurality of image forming devices, and selecting an image forming device, which is able to execute a function set on the information input screen, as the destination device according to the acquired function information, and controlling the display means in such a manner as to display information about the selected image forming device on the information input screen, if the automatic destination device selecting mode is designated.

According to the above construction, the operability in setting functions relating to image formation in the automatic destination device selecting mode can be greatly enhanced.

Preferably, in the function setting method, if the automatic destination device selecting mode is designated, whenever a function is set on the information input screen, an image forming device, which is able to execute the set function, is selected.

Preferably, the function setting method further comprises the step of storing priority information with respect to the image forming devices in storage means, and wherein an image forming device, which is able to execute a function set on the information input screen, is selected according to the acquired function information if the automatic destination device selecting mode is designated.

Also preferably, in the function setting method, the information relating to the selected image forming device includes information indicating all functions that can be executed by the selected image forming device.

To attain the second object, the present invention provides a storage medium that can be read by a computer containing a program for setting functions on an image forming system, which has a plurality of functions relating to image formation and includes a plurality of image forming devices connected through communication media, and wherein an image forming device is selected from the image forming devices as a destination device for formation of an image inputted from one of the plurality of image forming devices, the program comprising a function setting input module for displaying an information input screen for setting functions relating to the image formation on display means and performing an inputting operation relating to setting of the functions on the information input screen, a function information acquiring module for acquiring function information representing a plurality of functions relating to the image formation from the plurality of image forming devices, a mode designating module for designating an automatic destination device selecting mode for automatically selecting an image forming device as a destination device among the plurality of image forming devices, a destination device selecting module for selecting an image forming device, which is able to execute a function set on the information input screen, as the destination device, according to the acquired function information if the automatic destination device selecting mode is designated, and a display control module for displaying information about the selected image forming device on the information input screen.

According to the above construction, the operability in setting functions relating to image formation in the automatic destination device selecting mode can be greatly enhanced.

Preferably, in the storage medium, if the automatic destination device is designated, the destination device selecting module is operable whenever a function is set on the information input screen, to select an image forming device, which is able to execute the set function.

Preferably, in the storage medium, the program further comprises priority information storing means for storing priority information with respect to the image forming devices, and wherein the destination device selecting module selects an image forming device, which is able to execute a function set on the information input screen, according to the acquired function information with reference to the priority information if the automatic destination device selecting mode is designated.

Also preferably, in the storage medium, the information about the selected image forming device includes information indicating all functions that can be executed by the selected image forming device.

To attain the second object, the present invention provides an image forming system which has a plurality of functions relating to image formation and includes a plurality of image forming devices connected through communication media, and wherein an image forming device is selected from the plurality of image forming devices as a destination device for formation of an image inputted from one of the plurality of image forming devices, the image forming system comprising display means for displaying an information input screen for setting functions relating to the image formation, function setting input means for inputting information relating to setting of the functions on the information input screen, function information acquiring means for acquiring function information representing a plurality of functions relating to the image formation from the image forming devices, selecting mode designating means for designating an automatic destination device selecting mode for automatically selecting an image forming device as a destination device among the image forming devices, and control means for sampling an image forming device, which is able to execute a function currently set on the information input screen, as a prospective destination device according to the acquired function information and displaying information about functions relating to the sampled image forming device on the information input screen, if the automatic destination device selecting mode is designated.

According to the above construction, the operability in setting functions relating to image formation in the automatic destination device selecting mode can be greatly enhanced.

Preferably, in the image forming system, when the information about the functions relating to the sampled image forming device is displayed on the display means, the function setting input means makes settable only a function that can be executed by the sampled image forming device.

To attain the second object, the present invention provides an image forming device having a plurality of functions relating to image formation and being capable of selecting other image forming devices connected to the image forming device through communication media, as a destination device for an inputted image, the image forming device comprising display means for displaying an information input screen for setting functions relating to the image formation, function setting input means for performing an inputting operation relating to setting of the functions on the information input screen, function information acquiring means for acquiring function information indicating functions relating to the image formation from the image forming device and the other image forming devices, mode designating means for designating an automatic destination device selecting mode for automatically selecting an image forming device as a destination device from the image forming device and the other image forming devices, and control means for sampling an image forming device, which is able to execute a function currently set on the information input screen, as a prospective destination device according to the acquired function information and displaying information about functions relating to the sampled image forming device on the information input screen, if the automatic destination device selecting mode is designated.

According to the above construction, the operability in setting functions relating to image formation in the automatic destination device selecting mode can be greatly enhanced.

Preferably in the image forming device, when the information about the functions relating to the sampled image forming device is displayed on the display means, the function setting input means makes settable only a function that can be executed by the sampled image forming device.

To attain the second object, the present invention provides a function setting method of setting functions of an image forming system including a plurality of image forming devices having a plurality of functions relating to image formation and being connected to one another through communication media, the image forming system being capable of selecting an image forming device from the plurality of image forming devices as a destination device for forming an image inputted from one of the image forming devices, the method comprising the steps of acquiring function information indicating a plurality of functions relating to the image formation from the image forming devices, displaying an information input screen for setting the functions on display means, performing an inputting operation relating setting of the functions on the information input screen, designating an automatic destination device selecting mode for automatically selecting a destination image forming device from the plurality of image forming devices, and sampling an image forming device, which is able to execute a function currently set on the information input screen, as a prospective destination device according to the acquired function information and displaying information about functions relating to the sampled image forming device on the information input screen, if the automatic destination device selecting mode is designated.

According to the above construction, the operability in setting functions relating to image formation in the automatic destination device selecting mode can be greatly enhanced.

Preferably, in the function setting method, the step of performing the inputting operation comprises making settable only a function that can be executed by the sampled image forming device when the information about the functions relating to the sampled image forming device is displayed on the display means.

To attain the second object, the present invention provides a storage medium that can be read by a computer containing a program for setting functions on an image forming system, which has a plurality of functions relating to image formation and includes a plurality of image forming devices connected through communication media, and wherein an image forming device is selected from the image forming devices as a destination device for formation of an image inputted from one of the plurality of image forming devices, the program comprising a function setting input module for displaying an information input screen for setting functions relating to the image formation on display means and performing an inputting operation relating to setting of the functions on the information input screen, a function information acquiring module for acquiring function information representing a plurality of functions relating to the image formation from the image forming devices, a selecting mode designating module for designating an automatic destination device selecting mode for automatically selecting an image forming device as a destination device among the image forming devices, and a prospective destination device sampling module for sampling an image forming device, which is able to execute a function currently set on the information input screen, as a prospective destination device according to the acquired function information, if the automatic destination device selecting mode is designated, and a display control module for displaying information about functions relating to the sampled image forming device on the information input screen.

According to the above construction, the operability in setting functions relating to image formation in the automatic destination device selecting mode can be greatly enhanced.

Preferably, in the storage medium, when the information about the functions relating to the sampled image forming device is displayed on the display means, the function setting input module makes settable only a function that can be executed by the sampled image forming device.

To attain the first object, the present invention provides an apparatus for transmitting image data to one of image forming apparatus comprising selecting means having a first mode in which one of the plurality of image forming apparatus is selected in accordance with a designation of an individual image forming apparatus by an operator, and a second mode in which one of the plurality of image forming apparatus is selected without a designation for an individual image forming apparatus by the operator, and display control means for controlling a display means, wherein in the first mode, the display control means controls the display means in a manner such that at least one function that is executable by a currently selected one of the plurality of image forming apparatus is displayed on a screen for setting functions, while at least one function that is not executable by the currently selected one of the plurality of image forming apparatus is not displayed on the screen or displayed on the screen in a manner that it can be recognized by the operator as not being executable by the currently selected one of the plurality of image forming apparatus, and in the second mode, the display control means controls the display means in a manner such that at least one function that is executable by any of a plurality of prospective destination image forming apparatus is displayed on the screen, while at least one function that is not executable by any of the plurality of prospective destination image forming apparatus is not displayed on the screen or displayed on the screen in a manner that it can be recognized by the operator as not being executable by any of the plurality of prospective destination image forming apparatus.

Preferably, the plurality of prospective destination image forming apparatus are ones of the plurality of image forming apparatus that can execute at least one set function.

To attain the first object, the present invention provides an apparatus for transmitting image data to one of image forming apparatus comprising selecting means having a first mode in which one of the plurality of image forming apparatus is selected in accordance with a designation of an individual image forming apparatus by an operator, and a second mode in which one of the plurality of image forming apparatus is selected without a designation for an individual image forming apparatus by the operator, and display control means for controlling a display means, wherein in the second mode, the selecting means is responsive to an instruction for setting a function, for again selecting one of the plurality of image forming apparatus that can execute the function, and the display control means controls the display means to display a screen containing information indicative of the again selected image forming apparatus.

The above and other objects, features, and advantages of the invention will become apparent from the following detailed description taken in conjunction with the accompanying drawings.

BRIEF DESCRIPTION OF THE DRAWINGS

FIG. 12 is a flow chart showing a procedure for displaying an operating screen of the image forming device in FIG. 1;

FIG. 13 is a diagram showing a function block for setting functions of an image forming system according to a second embodiment of the present invention;

DETAILED DESCRIPTION OF PREFERRED EMBODIMENTS

Preferred embodiments of the present invention will be described hereinabelow with reference to the accompanying drawings.

First Embodiment

Figure 1:
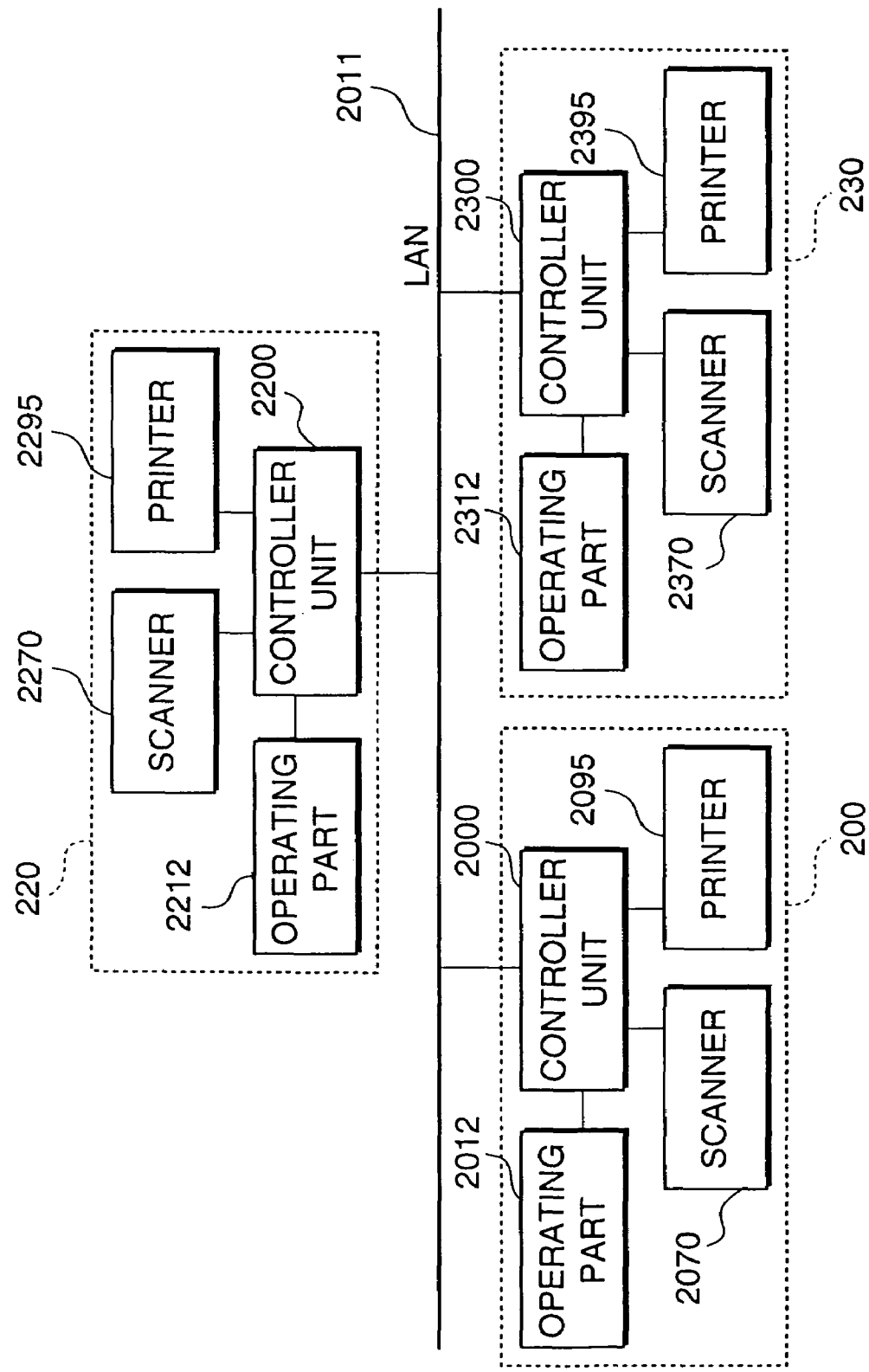
FIG. 1 is a block diagram showing the construction of an image forming system according to a first embodiment of the present invention.

FIG. 1 is a block diagram showing the construction of an image forming system according to a first embodiment of the present invention.

As shown in FIG. 1, the image forming system is comprised of image forming devices 200, 220, 230 which are connected to one another through a LAN (local area network) 2011. The image forming device 200 has a controller unit 2000, an operating part 2012 that functions as a user's interface, a scanner 2070 as an image input device, and a printer 2095 as an image output device. The operating part 2012, the scanner 2070 and the printer 2095 are connected to the controller unit 2000, which controls the whole device 200 and is connected to the LAN 2011. Likewise, the respective image forming devices 220, 230 have controller units 2200, 2300; operating parts 2212, 2312; scanners 2270, 2370; and printers 2295, 2395. The controller units 2200, 2300 of the respective image forming devices 220, 230 are connected to the LAN 2011.

Figure 2:
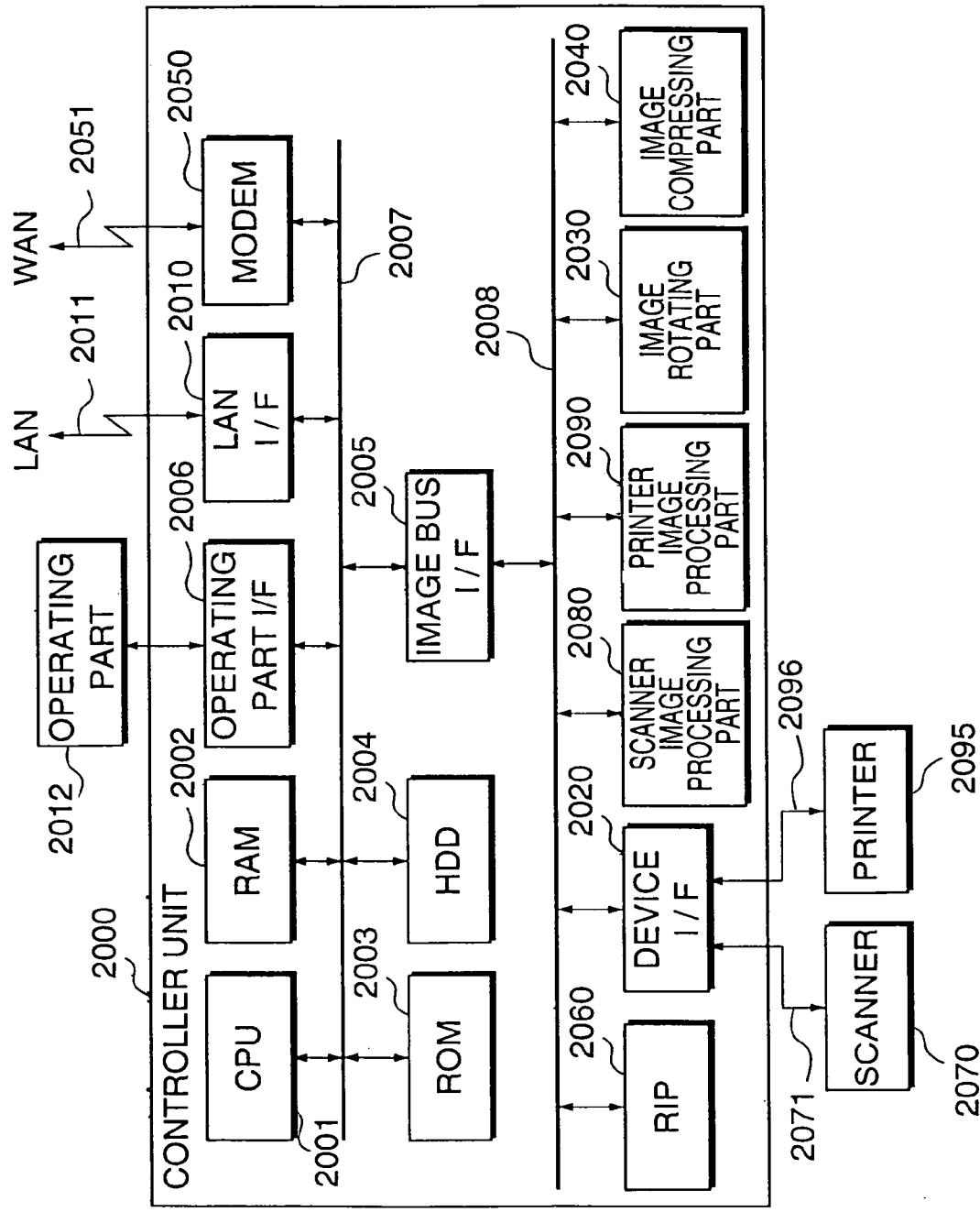
FIG. 2 is a block diagram showing the construction of an image forming device 200 of the image forming system in FIG. 1.

Referring next to FIG. 2, a description will now be given of the construction of the image forming device 200. FIG. 2 is a block diagram showing the construction of the image forming device 200 in the image forming system in FIG. 1. The other image forming devices 220, 230 will not be described here since they have the same construction as the image forming device 200.

As shown in FIG. 2, the image forming device 200 has a controller unit 2000 that connects with the scanner 2070 and the printer 2095 and connects with the LAN 2010 and a wide area network (WAN) 2051. The controller unit 2000 controls the input/output of image information and device information in a copying function, a printer function of printing data supplied from the outside through the LAN 2011, and a communication function including a facsimile function using the WAN 2051. The controller unit 2000 also controls the device 200 as a whole.

The controller unit 2000 has a CPU 2001 that activates the system according to a boot program stored in a ROM 2003, and that reads control programs stored in a HDD (hard disk device) 2004 on this system to execute predetermined processing using a RAM 2002 as a work area. The HDD 2004 contains image data as well as the programs.

Connected to the CPU 2001 are the RAM 2002, the ROM 2003, the HDD 2004, an operating part I/F (operating part interface) 2006, a LAN I/F (LAN interface) 2010, a modem 2050, and an image bus I/F (image bus interface) 2005 through a system bus 2007.

The operating part I/F 2006 is an interface that communicates information to and from the operating part 2012. The operating part I/F 2006 transfers image data to be displayed on the operating part 2012 to the operating part 2012, transfers signals generated by an inputting operation on the operating part 2012 to the CPU 2001, and the like. The operating part 2012 has a display part for displaying an information input screen and the like for use in inputting current setting conditions of each function relating to image information and setting information about each function, an input part including keys and the like for use in inputting setting information about each function, and so forth. The structure of the operating part 2012 will be described later in further detail.

The LAN I/F 2010 is connected to the LAN 2011, and inputs and outputs information through the LAN 2011. A modem 2050 is connected to the WAN 2051, and inputs and outputs information through the WAN 2051. The image bus I/F 2005 is comprised of a bus bridge that connects the image bus 2008 with the system bus 2007 and converts a data structure. The image bus 2008 is comprised of a PCI bus that is capable of transferring image data at a high speed or a bus that conforms to IEEE 1394 standards.

Connected to the image bus 2008 are a RIP (raster image processor) 2060, a device I/F (device interface) 2020, a scanner image processing part 2080, a printer image processing part 2090, an image rotating part 2030 and an image compressing part 2040.

The RIP 2060 develops a PDL code into a bit map image. The device I/F 2020 connects the scanner 2070 and the printer 2095 as image input/output devices to the controller unit 2000, and converts the image data into synchronous/asynchronous data. The device I/F 2020 is connected to the scanner 2070 through a cable 2071, and is connected to the printer 2095 through a cable 2096. The scanner image processing part 2080 corrects, processes and edits the inputted image data. The printer image processing part 2090 corrects the printer, converts resolution of the printer, and the like, for printed image data. The image rotating part 2030 rotates the image data. The image compressing part 2040 performs JPEG compression/expansion for multivalued image data and performs JBIG, MMR, MH compression/expansion for binary image data.

The CPU 2001 of the controller unit 2000 collectively controls access to the devices connected to the system bus 2007 according to each control program, and reads image information from the scanner 2070 through the device IF 2020. The CPU 2001 executes a predetermined processing for the read image information, and then outputs the image information to the printer 2095 through the device I/F 2020.

Figure 3:
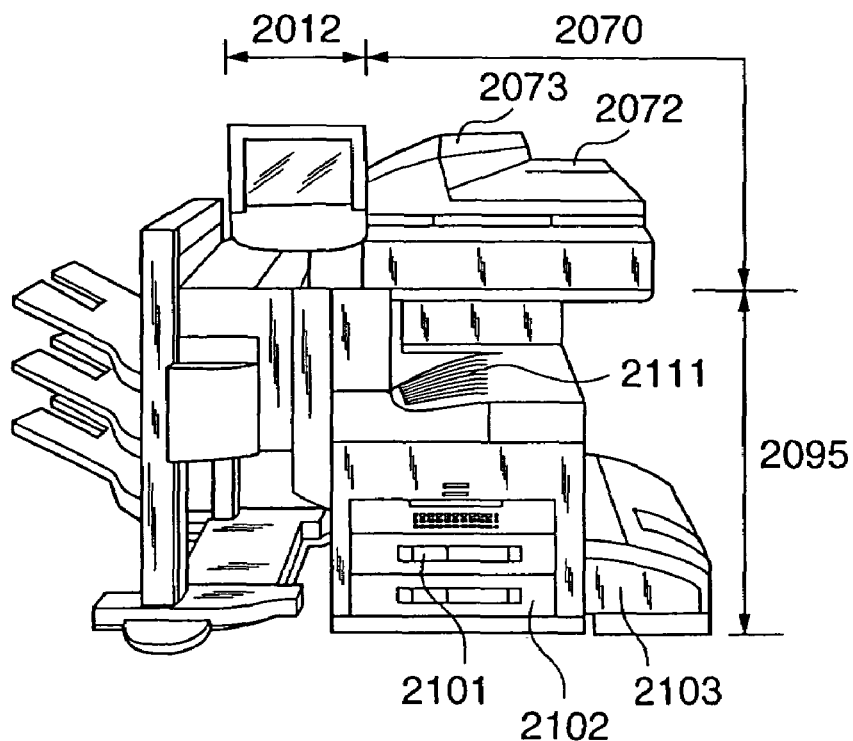
FIG. 3 is a perspective view of the image forming device in FIG. 1.

Referring next to FIG. 3, a description will be given of the external structure of the image forming device 200. FIG. 3 is a perspective view of the image forming device in FIG. 1. The other image forming devices 220, 230 will not be described here since they have the same external structure as the image forming device 200.

As shown in FIG. 3, the scanner 2070 and the printer 2095 are integrally incorporated into the image forming device 200, and the scanner 2070 has the operating part 2012.

The scanner 2070 illuminates images on manuscripts and scans a CCD line sensor (not shown) to thereby read the images on the manuscripts. The scanner 2070 converts the read images into raster images by photoelectric conversion. The manuscripts are set on a tray 2073 of a manuscript feeder 2070. When a user gives a reading starting command through the operating part 2012, the CPU 2001 of the controller unit 2000 (FIG. 2) instructs the scanner 2070 to read the manuscript. In accordance with the instruction of the CPU 2001, the manuscripts are fed one by one from the manuscript feeder 2071, and the images are read on a manuscript-by-manuscript basis.

The printer 2095 forms an image in such a manner as to convert raster image data transferred from the device I/F 2020 through the cable 2096 into an image on paper. The image is formed by electrophotography, in which an electrostatic latent image is formed by scanning a laser on an electrostatic latent image carrier such as a photosensitive drum and a photosensitive belt according to the raster image data. Electrophotography is used in the present embodiment, but it is also possible to use another image formation method such as an ink-jet printing method wherein an image is directly printed on paper by jetting an ink from micro nozzle arrays.

The printing is activated by a command from the CPU 2001 of the controller unit 2000 (FIG. 2). The printer has a plurality of paper feeding sections in order to select different paper sizes or different paper directions. Paper cassettes 2101, 2102, 2103, in which paper sheets in different sizes are placed in different directions, are mounted in each paper feeding tray. The paper on which the image is formed is discharged onto a paper discharge tray 2111.

Figure 4:
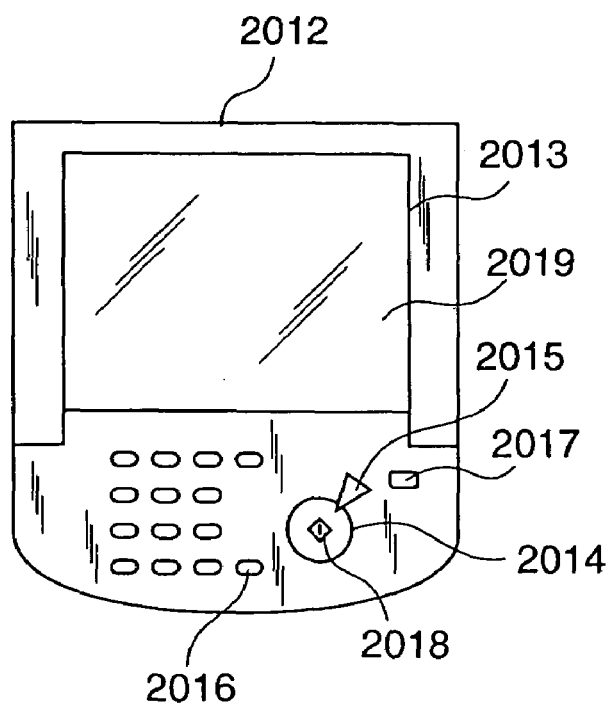
FIG. 4 is a view showing the layout of an operating part 2012 in FIG. 2.

Referring next to FIG. 4, a description will be given of the structure of the operating part 2012. FIG. 4 shows the layout of the operating part 2012 in FIG. 2.

As shown in FIG. 4, the operating part 2012 has a liquid crystal display (hereinafter referred to as LCD) 2013 in that a touch panel sheet 2019 is attached to a screen, and a plurality of hard keys. The LCD 2013 displays a system operating screen and soft keys. In response to the depression of the displayed soft keys, a positional information thereof is outputted to the CPU 2001 of the controller unit 2000 through the operating part I/F 2006. A start key 2014, a stop key 2015, an ID key 2016 and a reset key 2017 are provided as the hard keys. The start key 2014 is used to give a command to start reading the manuscript image, and a two-color LED 2018 in green and red is attached to the center of the start key 2014. The two-color LED 2018 illuminated in red indicates that the depression of the start key 2014 will not be accepted. The two-color LED 2018 illuminated in green indicates that the depression of the start key 2014 will be accepted. The stop key 2015 is used to stop the actions being taken. The ID key 2016 is used to input a user's ID. The reset key 2017 is used to initialize the setting from the operating part 2012.

Figure 5:
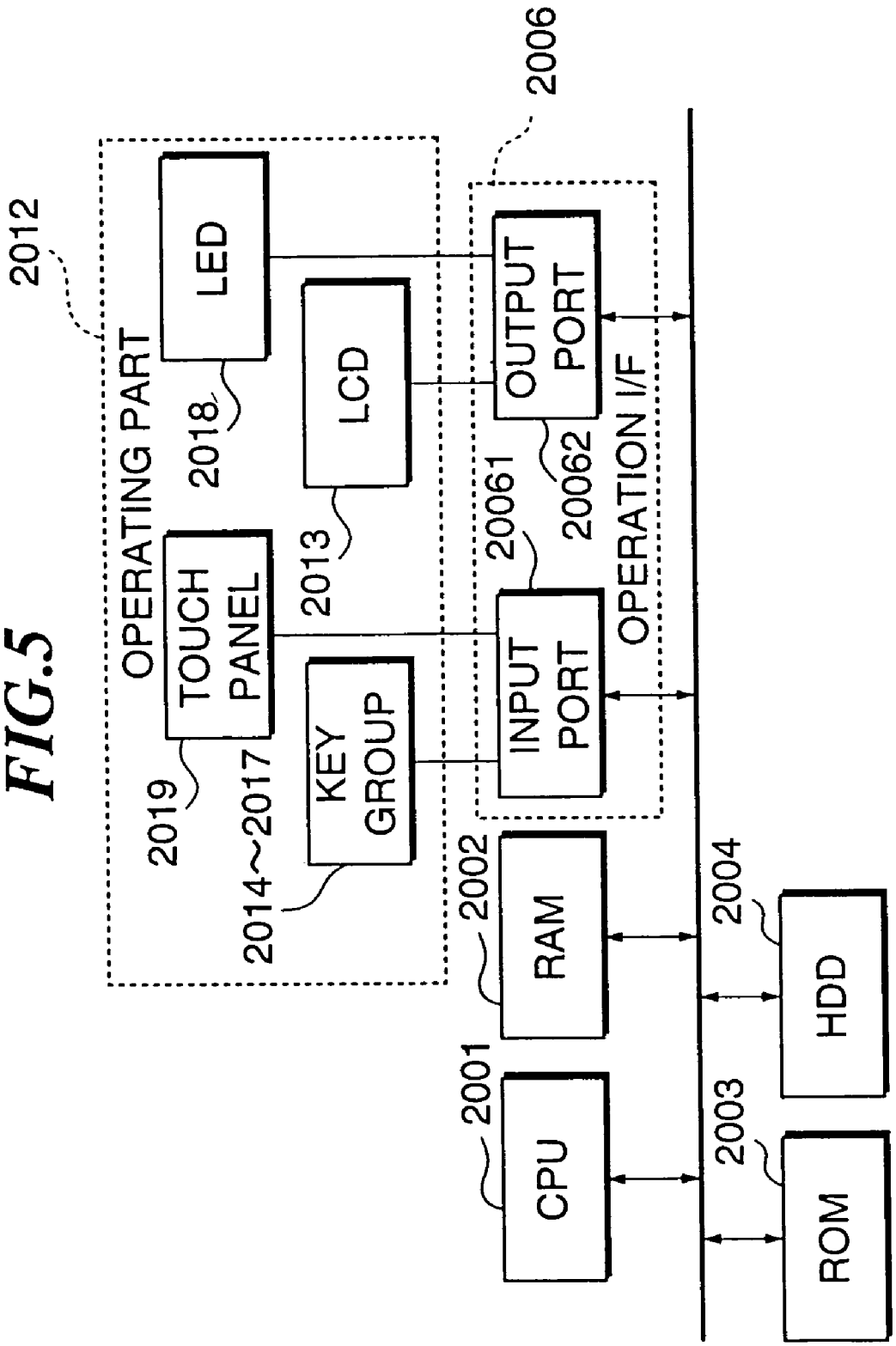
FIG. 5 is a block diagram showing the construction of the operating part 2012 in FIG. 2 and peripheral parts thereof.
Figure 6:
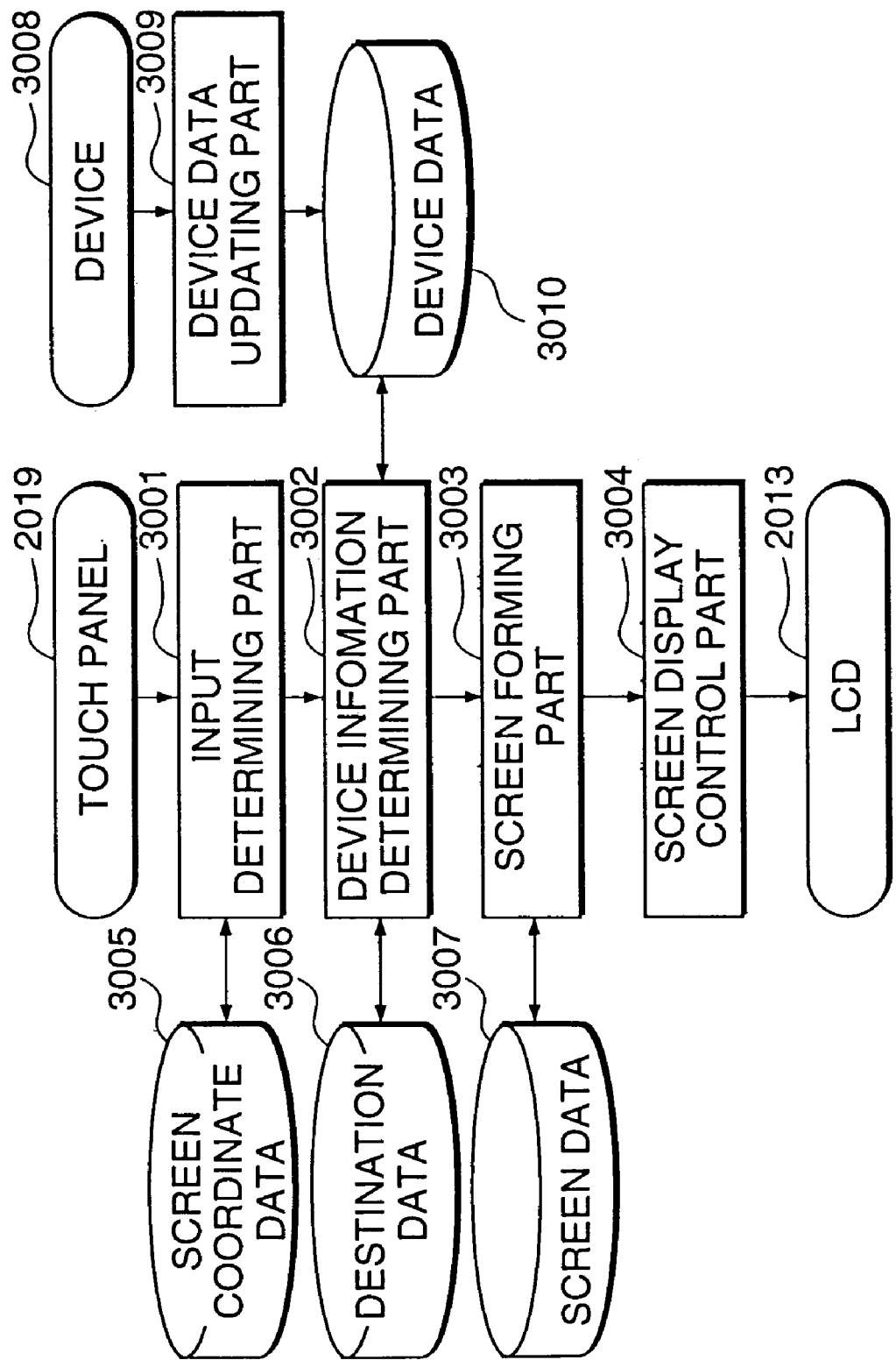
FIG. 6 is a diagram showing a function block for setting functions of the image forming device in FIG. 2.

Referring next to FIGS. 5 and 6, a description will be given of the control operation of the CPU 2001 with respect to the operating part 2012. FIG. 5 is a block diagram showing the structure of the operating part 2012 in FIG. 2 and peripheral parts thereof. FIG. 6 is a diagram showing a block function for setting functions of the image forming device in FIG. 2.

At the operating part 2012, the touch panel 2019 and the key group composed of the hard keys 2014-2017 are connected to the CPU 2001 through an input port 20061 of the operating part I/F 2006 as shown in FIG. 5. Positional information indicating the depressed position of the touch panel 2019 and key information about the depression of the key group are inputted to the CPU 2001 through the input port 20061. The two-color LED 2018 and the LCD 2013 of the operating part 2012 are connected to the CPU 2001 through an output port 20062 of the operating part I/F 2006. The CPU 2001 controls the illumination of the two-color LED 2018 and the display on the LCD 2013.

According to the present embodiment, an operating screen for setting each function relating to the image formation in an individual destination device selecting mode or an automatic destination device selecting mode is displayed. In the individual destination device selecting mode, the LCD 2013 is controlled in such a manner as to display, on the operating screen, only function information representing functions of the image forming device selected by the individual destination device selecting mode with reference to previously-stored function information. In the automatic destination device selecting mode, logical sums are found with respect to the functions of each image forming device with reference to the previously-stored function information. The LCD 2013 is controlled in such a manner as to display function information representing functions obtained from the found logical sums. By the inputting operation on the operating screen, the functions relating to the image formation are designated, and an image processing device for executing the designated functions is selected. The displaying process on the operating screen is constructed by reading the control program stored in the HDD 2004 by the CPU 2001.

As shown in FIG. 6, a function block for executing the operating screen displaying process has an input determining part 3001 which calculates coordinates corresponding to the depressed position on the operating screen displayed on the LCD 2013, i.e., the depressed position on the touch panel 2019 and determines information indicated by the depressed position on the touch panel 2019 according to the calculated coordinates with reference to screen coordinate data 3005. For example, the input determining part 3001 determines whether a destination device for the image is designated or a command to display the paper size selecting screen is given, according to the depressed position on the touch panel 2019. The screen coordinate data 3005 is provided for each operating screen, and is stored in the HDD 2004.

Information representing the predetermined determination results of the input determining part 3001 is inputted to a device information determining part 3002.

When the destination device for the image is designated, the device information determining part 3002 determines that not the automatic destination device selecting mode for automatically selecting the destination device, but the individual destination device selecting mode is designated. According to the determination results, the device information determining part 3002 rewrites destination data 3006 and produces destination device display screen information.

When the command to display the paper size selecting screen is given, the device information determining part 3002 reads the currently-set destination device selecting mode from the destination data 3006, and reads device data about the destination device from device data 3010 according to the currently-set destination device selecting mode, thereby producing paper selecting screen information corresponding to the mode or the destination device. The destination data 3006 and the device data 3010 are stored in the HDD 2004.

The screen information produced by the device information determining part 3002 is inputted to a screen forming part 3003. The screen forming part 3003 produces a display screen by combining the inputted screen information with actual screen data 3007. The produced display screen is displayed on the LCD 2013 under the control of a screen display control part 3004.

A device data updating part 3009 updates the device data 3010 to the newest data whenever necessary. The device data updating part 3009 acquires information from devices (remote devices) on the LAN 2011 and a local device whenever necessary, and updates the device data 3010 according to the acquired information. The remote devices correspond to the image forming devices 220, 230, and the local device corresponds to the image forming device 200. These image forming devices are registered in advance.

According to the present embodiment, the control program for executing the operating screen displaying process is stored in the HDD 2004, but the control program may be stored in the ROM 2003 in advance or may be supplied from another storage medium.

Figure 7:
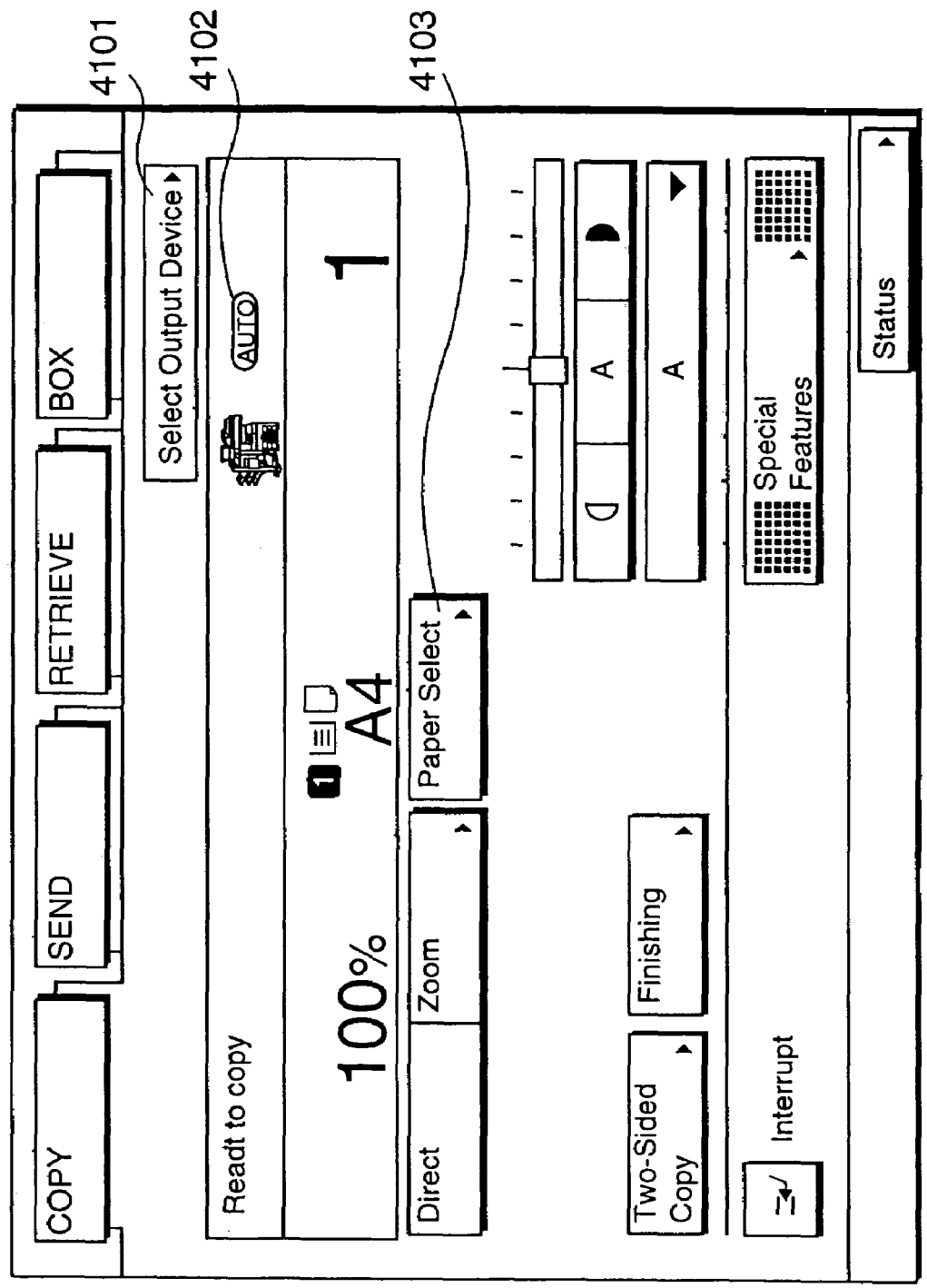
FIG. 7 is a view showing an example of an initial operating screen displayed on an LCD 2013.
Figure 8:
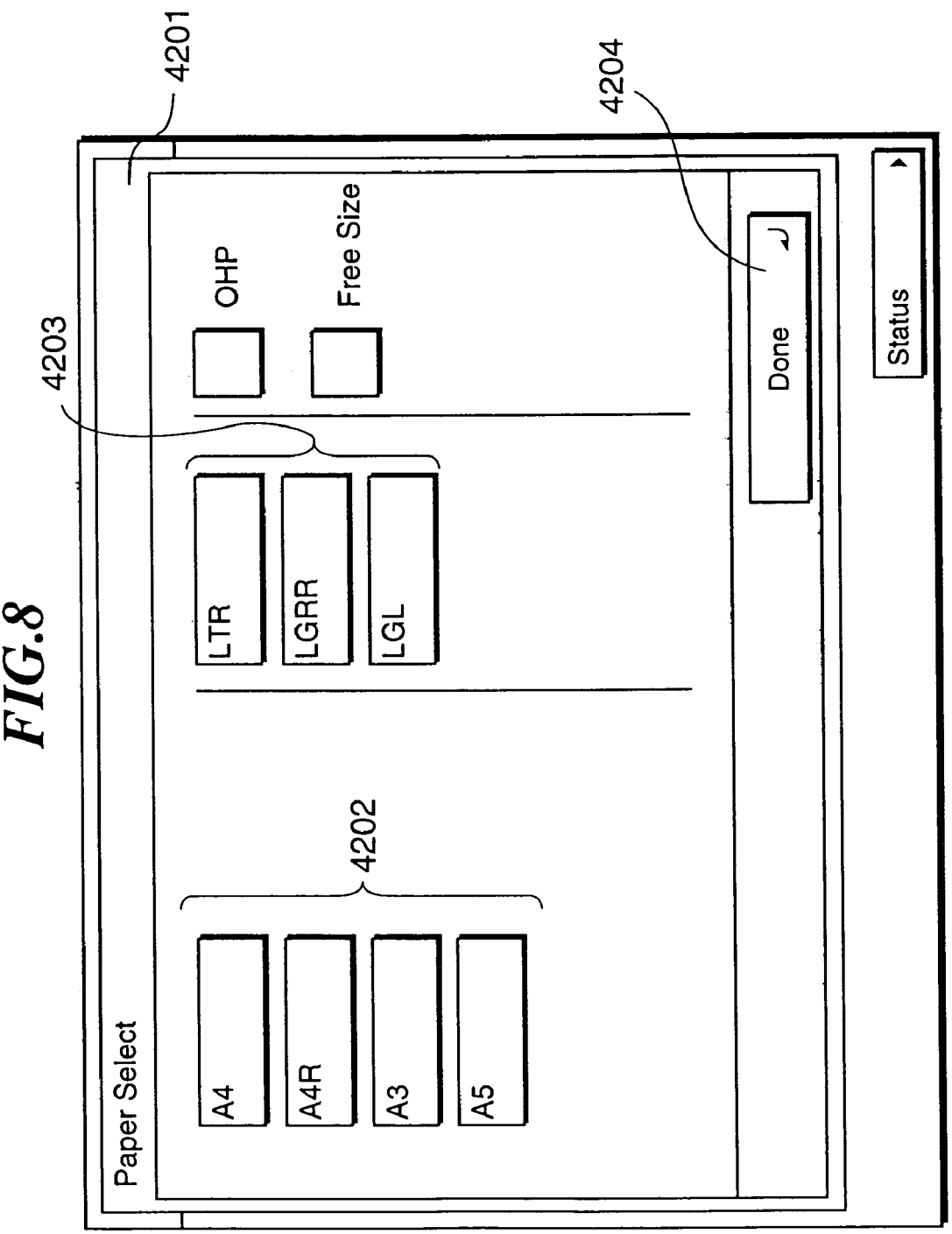
FIG. 8 is a view showing an example of a paper selecting screen displayed on an LCD 2013.
Figure 9:
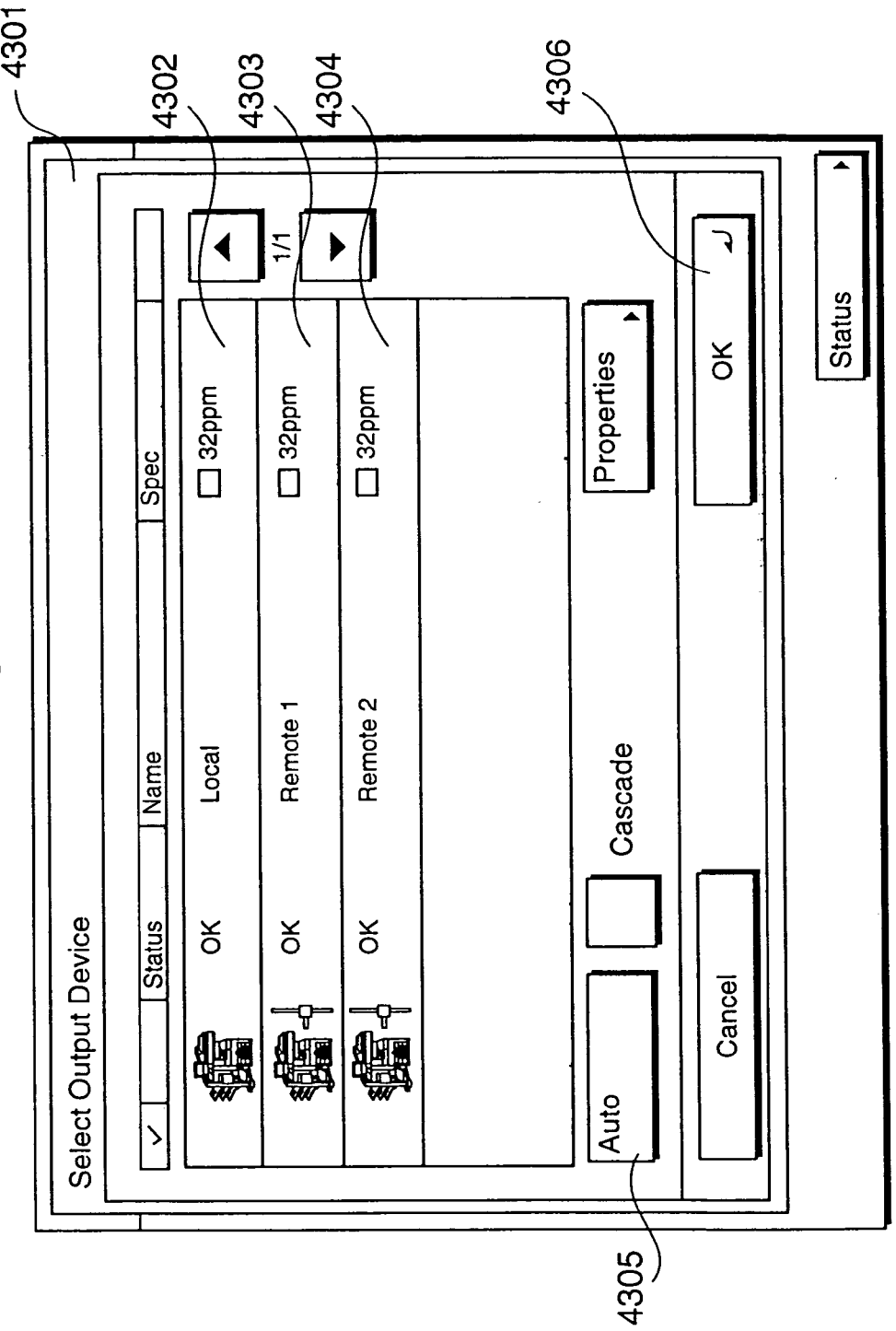
FIG. 9 is a view showing an example of a destination device designating display screen.
Figure 10:
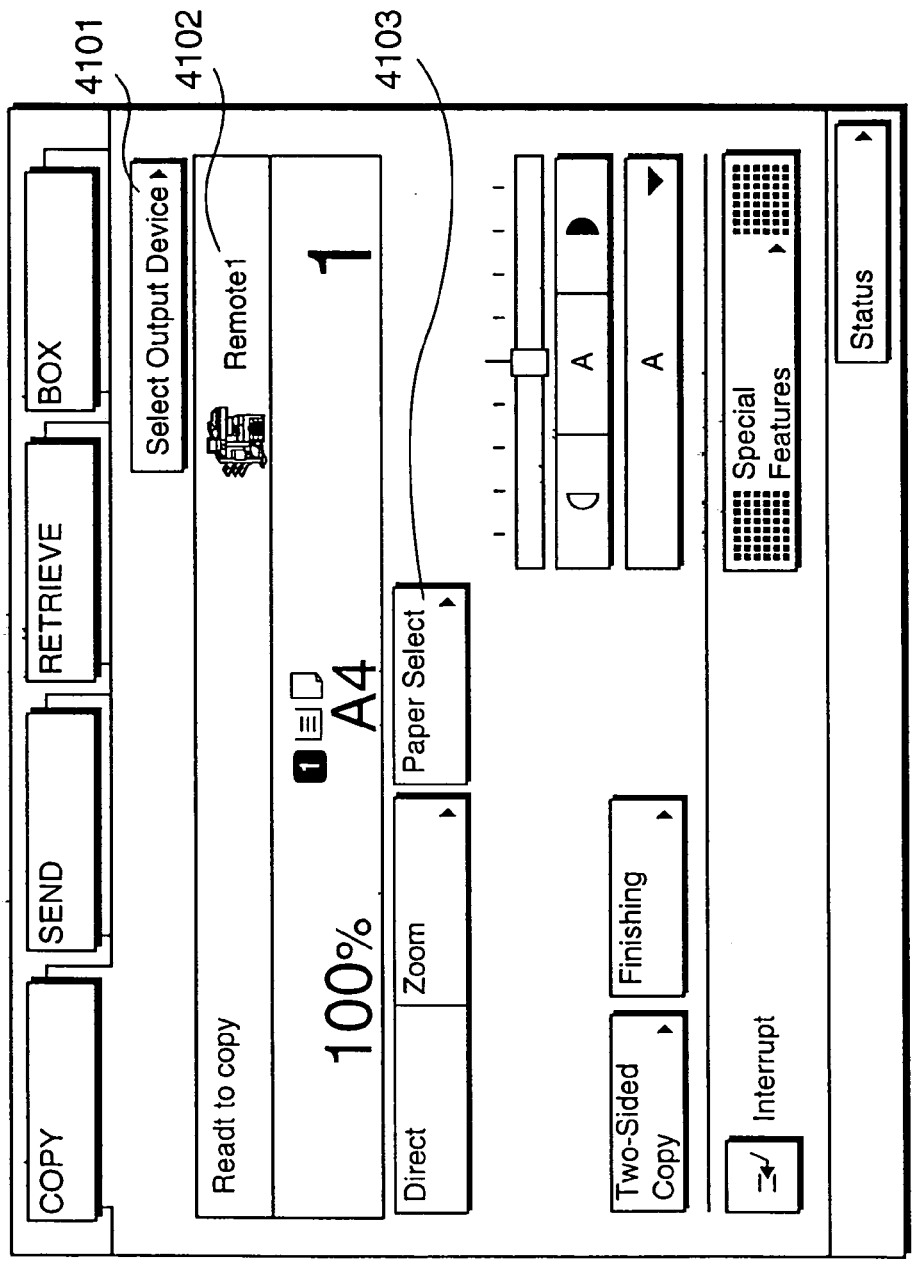
FIG. 10 is a view showing an example of a screen display in the case where a destination device is designated in the individual destination device selecting mode.
Figure 11:
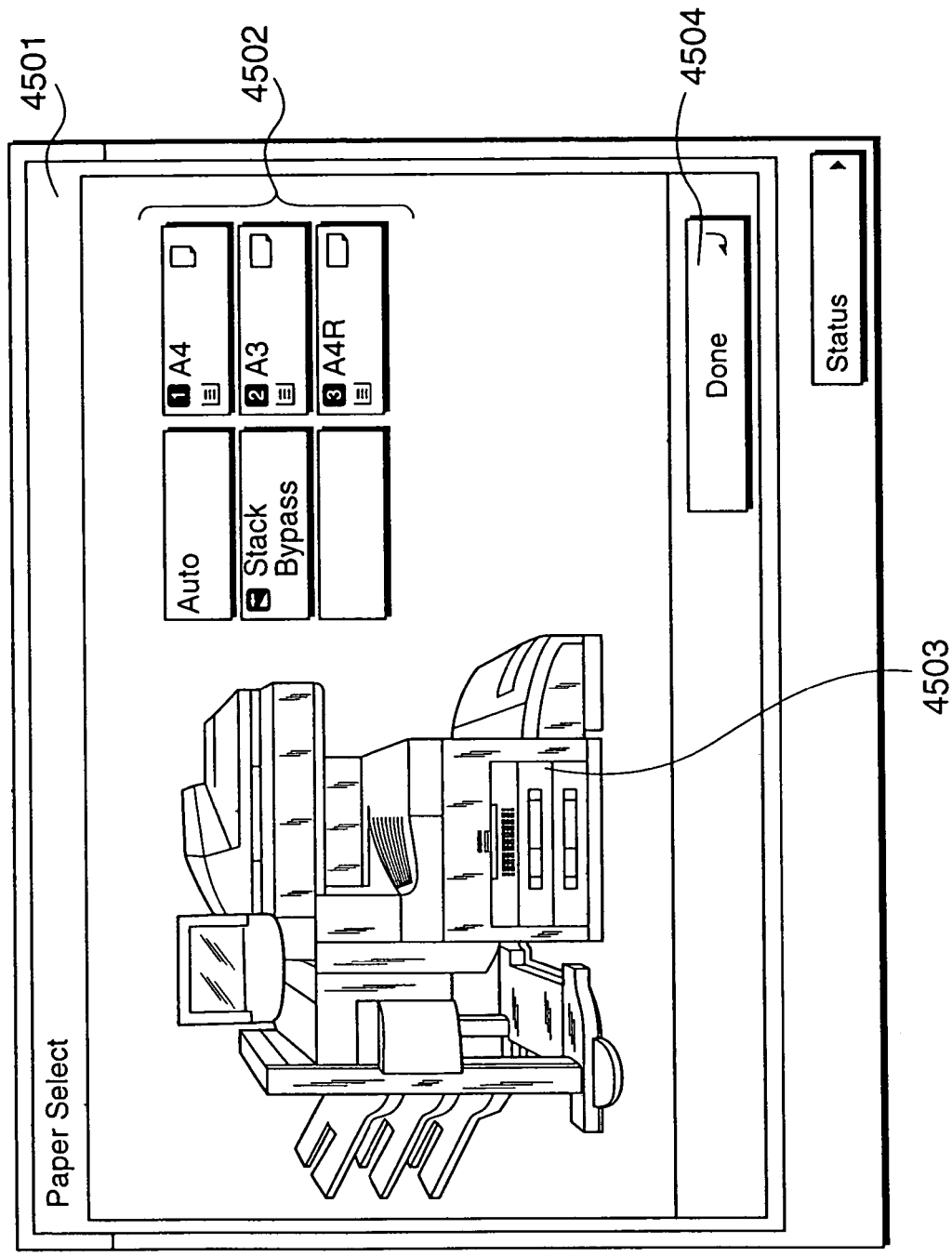
FIG. 11 is a view showing an example of a paper selecting screen corresponding to the destination device designated in the individual destination device selecting mode.

Referring next to FIGS. 7-11, there will be described an example of the display screen that is displayed as a result of the operating screen displaying process for setting the functions relating to the image formation. FIG. 7 is a view showing an example of an initial operating screen displayed on the LCD 2013; FIG. 8 is a view showing an example of a paper selecting screen displayed on the LCD 2013; FIG. 9 is a view showing an example of a destination device designating display screen; FIG. 10 is a view showing an example of a screen displayed in the case where a destination device is designated in the individual destination device selecting mode; and FIG. 11 is a view showing an example of the paper selecting screen corresponding to the destination device designated in the individual destination device selecting mode.

Here, a description will be given of the case where the destination device for the image inputted through the scanner 2070 is designated in the image forming device 200. As shown in FIG. 7, the operating screen is displayed on the LCD 2013 of the operating part 2012 of the image forming device 200. The operating screen shows an destination device designating dialogue display key 4101 for displaying a dialogue that designates which destination device should output the image inputted from the scanner 2070 of the image forming device 200. On the operating screen, when an automatic destination device selecting mode is set as a default or by a designating operation, described later, character information "AUTO" indicating that the automatic destination device selecting mode is set is displayed on a designation device display part 4102.

For example, when a paper selecting dialogue display key (Paper Select) 4103 is depressed in order to designate a paper selection in the automatic destination device selecting mode, a paper selecting dialogue 4201 in FIG. 8 is displayed. In the paper selecting dialogue 4201, a paper selecting key is displayed correspondingly to the paper size acquired from logical sums of the sizes of the papers contained in the paper cassettes in devices to which the image from the image forming device 200 may be outputted. In this case, the devices to which the image from the image forming device 200 may be outputted are the printer 2095 of the image forming device 200, a printer 2295 of the image forming device 220, and a printer 2395 of the image forming device 230. If the paper sizes of the papers contained in the printer 2095 are A4, A5 and A3, the paper sizes of the printer 2295 are A4, A3 and A4R, and the paper sizes of the printer 2395 are LTR, LTTR and LGR; the logical sums of these paper sizes are found and paper selecting keys 4202, 4203 corresponding to the paper sizes obtained from the found logical sums are displayed.

Then, a user depresses a paper selecting key corresponding to a desired paper size among the paper selecting keys 4202, 4203 to thereby select the desired paper size without paying any attention to the destination device. When the paper size is selected and a fixing key (Done) 4204 for fixing the paper size is depressed, the paper selecting dialogue 4201 is closed and the selected paper size is fixed. Then, the image inputted through the scanner 2070 is transferred to the image forming device having a printer that contains paper in the fixed paper size in response to depressing the start key 2014 (FIG. 4). The printer of the image forming device, to which the image has been transferred, forms the image on the paper in the designated size.

When the destination device designating dialogue display key 4101 is depressed on the operating screen in FIG. 7, a destination device designating dialogue 4301 in FIG. 9 is displayed. For example, a list of destination device designating fields 4302, 4303, 4304 is displayed in the destination device designating dialogue 4301. The name, the status, the output performance, etc. of the destination devices are displayed in the destination device designating fields 4302, 4303, 4304. The destination device designating fields 4302, 4303, 4304 have different background colors so that the currently-selected destination device can be distinguished from other destination devices.

The automatic designation device selecting mode setting key (Auto) 4305 is also displayed in the destination device designating dialogue 4301. The automatic destination device selecting mode can be set and cancelled by depressing the automatic destination device selecting mode setting key (Auto) 4305. When the automatic destination device selecting mode is set, the operating screen in FIG. 7 is displayed.

On the other hand, the individual designation device can be designated by depressing the corresponding destination device designating field among the destination device designating fields 4302, 4303, and 4304. When the destination device is designated by depressing one of the destination device designating fields and an OK key 4306 for fixing the designated device is depressed, the destination device designating dialogue 4301 is closed, and the destination device is fixed. If the automatic destination device selecting mode is previously set, the setting is cancelled. Then, an operating screen in FIG. 10 is displayed. As is the case with the operating screen in FIG. 7, a destination device designating dialogue display key 4101 and a paper selecting dialogue display key (Paper Select) 4103 are displayed on the operating screen, and information indicating the selected destination device is displayed on an output display part 4102. In this example, a remote device 1 (the image forming device 220) is selected by depressing the destination device designating field 4303 in FIG. 9, and character information "Remote 1" representing the selected remote device is displayed on the output display part 4102.

When the paper selecting dialogue display key (Paper Select) 4103 is depressed on the operating screen in FIG. 10, a paper selecting dialogue 4501 in FIG. 11 is displayed. The paper selecting dialogue 4501 displays paper selecting keys 4502 corresponding to the sizes of papers contained in the paper cassettes of the destination device (in this case the image forming device 220). The paper selecting dialogue 4501 also displays information 4503 indicating a paper feeding section of the paper in the selected size. The paper feeding section, the residual amount, etc. of the paper is displayed in each paper selecting key 4502. The user depresses a paper selecting key corresponding to a desired paper size in the paper selecting keys 4502 for selecting the desired paper size and depresses a fixing key (Done) 4504 in order to fix the selected paper size. Thus, the user can select the paper size on the paper selecting dialogue 4501 corresponding only to the designated destination device, and this improves the operability in the selection of the paper size. With the depression of the fixing key 4504, the paper selecting dialogue 4501 is closed, and the selected paper size is fixed. Then, in response to depressing the start key 2014, the image inputted through the scanner 2070 is transferred to the image forming device 220 containing the paper in the fixed paper size, and the printer 2295 of the image forming device 220 to which the image has been transferred forms the image on the paper in the designated size.

Referring next to FIG. 12, there will be described the operating screen displaying process. FIG. 12 is a flow chart showing the operating screen displaying process of the image forming devices in FIG. 1.

The following description refers to operations related to or caused by operation of keys which are concerned with the present invention, while description of operations related to or caused by operation of the other keys is omitted.

First, the inputting operation through the touch panel 2019 on the operating screen that is currently displayed is waited for in a step S5001, and the process goes to a step S5002 upon the inputting operation through the touch panel 2019. In the step S5002, whether the automatic destination device selecting mode is designated or not is determined according to the depressed position on the currently-displayed operating screen (FIG. 9) through the touch panel 2019. If the automatic destination device selecting mode is designated ("Auto" key 4305 is depressed), the process goes to a step S5012 where the word "Auto" representing the automatic destination device selecting mode is written as the current destination device setting in the destination data 3006, and the currently-displayed operating screen is updated to the operating screen in FIG. 7. Then, the process returns to the step S5001. If the automatic destination device selecting mode has not been designated, the process goes to a step S5003.

In the step S5003, according to the depressed position on the currently-displayed operating screen (FIG. 9) through the touch panel 2019, it is determined whether the destination device is individually selected by depressing one of the destination device fields 4302, 4303, 4304 and by depressing the "OK" key 4306. If the destination device is individually selected, the process goes to a step S5013 where information indicating the designated destination device is written as the current destination device setting in the destination data 3006, and the current operating screen is updated to the operating screen in FIG. 10. Then, the process returns to the step S5001. If the destination device is not designated, the process goes to a step S5004.

In the step S5004, it is determined whether the command to display the paper selecting dialogue is given by depressing the paper selecting dialogue display key 4103 on the screen in FIG. 7 or 10 or not. If the command to display the paper selecting dialogue is not given, the process goes to a step S5014 where another operation such as closing the operating screen is executed for the operating screen according to a key that is depressed, and then the process returns to the step S5001. If the display of the paper selecting dialogue is designated, the process goes to a step S5005.

In the step S5005, the destination data 3006 is read, and it is determined whether "Auto" is designated as the current destination device setting. If "Auto" is designated as the current destination device setting, the process goes to a step S5007 where device data about all devices is read from the device data 3010. Then, the process goes to a step S5008 to find logical sums of the sizes of the papers contained in each device. In a next step S5009, display data for constituting the paper selecting dialogue 4201 is read from the screen data 3007 in order to represent the paper sizes obtained from the found logical sums. In a step S5010, the paper selecting keys 4202, 4203 of the display data for constituting the paper selecting dialogue 4201 are changed into keys that correspond to the paper sizes obtained from the found logical sums in order to produce screen data.

Then, the process goes to a step S5011 where a screen corresponding to the produced screen data is displayed on the LCD 2013, followed by terminating the process.

If "Auto" is not designated as the destination device setting, in other words, it is determined that the individual selection of the destination device is designated in the step S5006, the process goes to a step S5015 to read the device data about the designated destination device from the device data 3010. Then, the process goes to a step S5016 to read display data that constitutes the paper selecting dialogue 4501 from the screen data 3007. In a next step S5017, the paper selecting key 4502 of the display data in the paper selecting dialogue 4501 is changed to keys corresponding to the read paper sizes to thereby produce screen data. Then, the process goes to a step S5011 to display, on the LCD 2013, a screen corresponding to the produced screen data, followed by terminating the process.

According to the present embodiment, when the automatic destination device selecting mode for automatically selecting the destination device or the individual destination device selecting mode is designated, the operation setting screen is changed according to the designated destination device selecting mode. This significantly improves the operability in setting the functions relating to the image formation in the individual destination device selecting mode or in the automatic destination device selecting mode.

Second Embodiment

Figure 14:
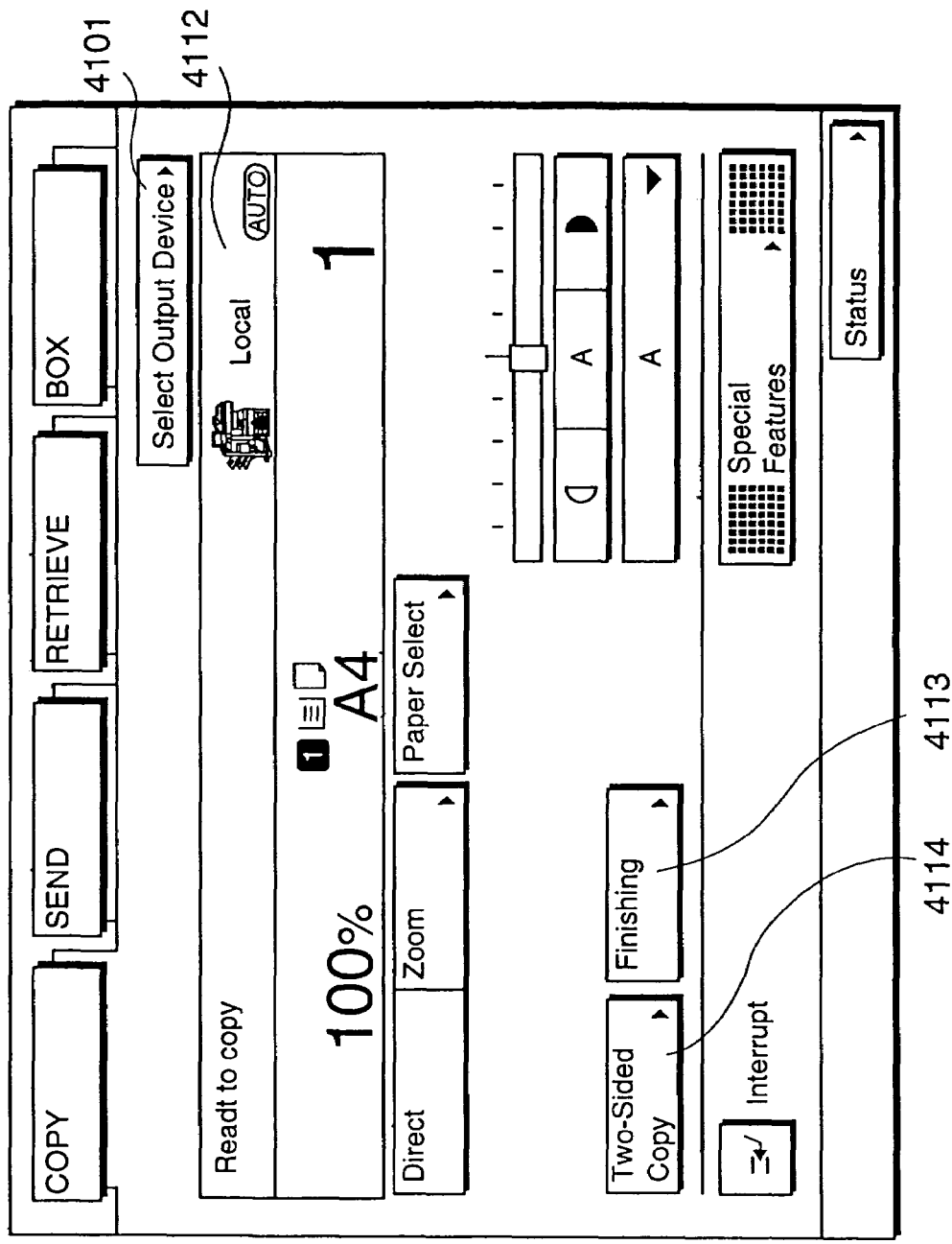
FIG. 14 is a view showing an example of an initialization screen displayed on an LCD 2013 of the image forming system according to the second embodiment.
Figure 15:
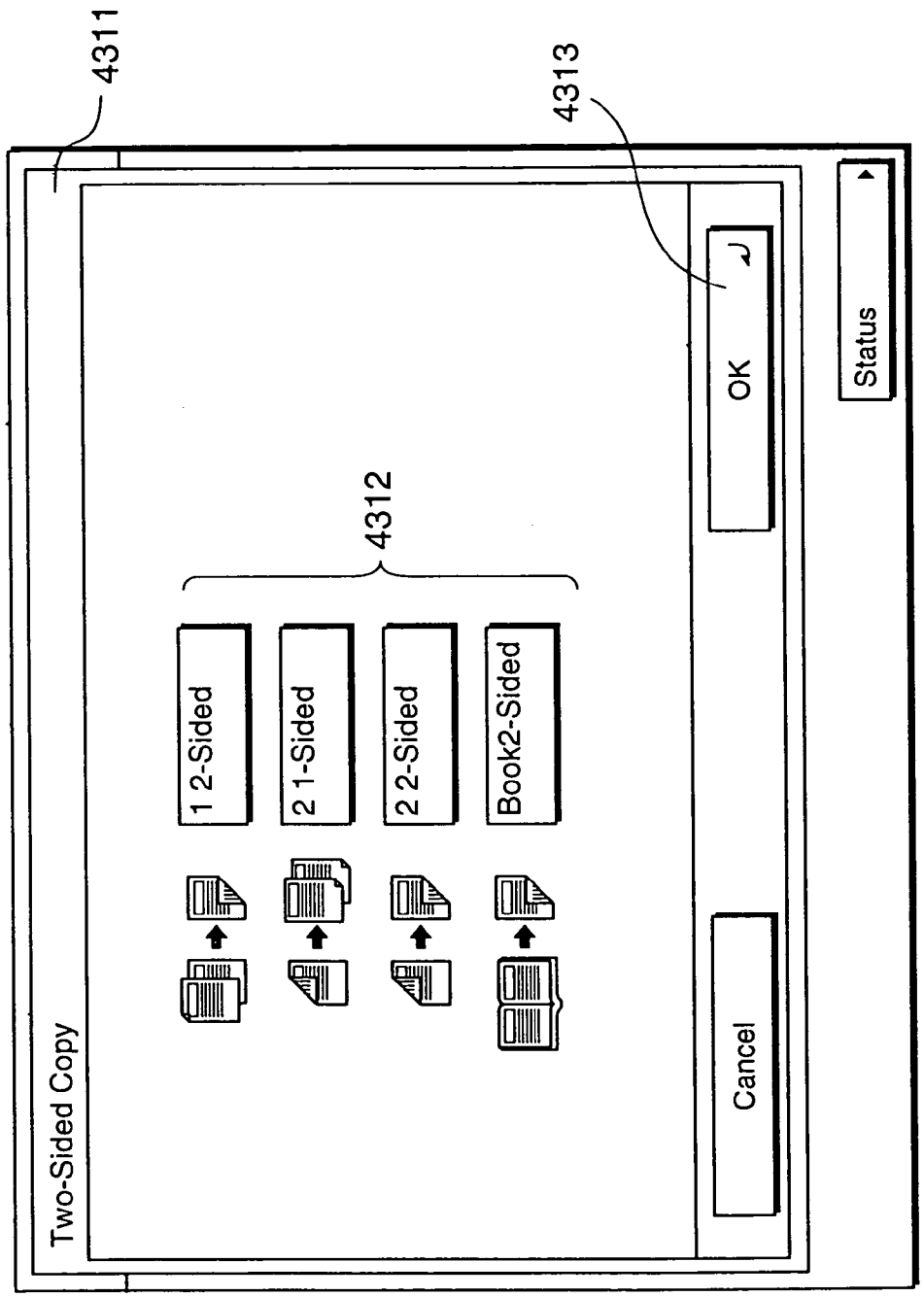
FIG. 15 is a view showing an example of a two-sided copying function setting dialogue displayed on the LCD 2013.
Figure 16:
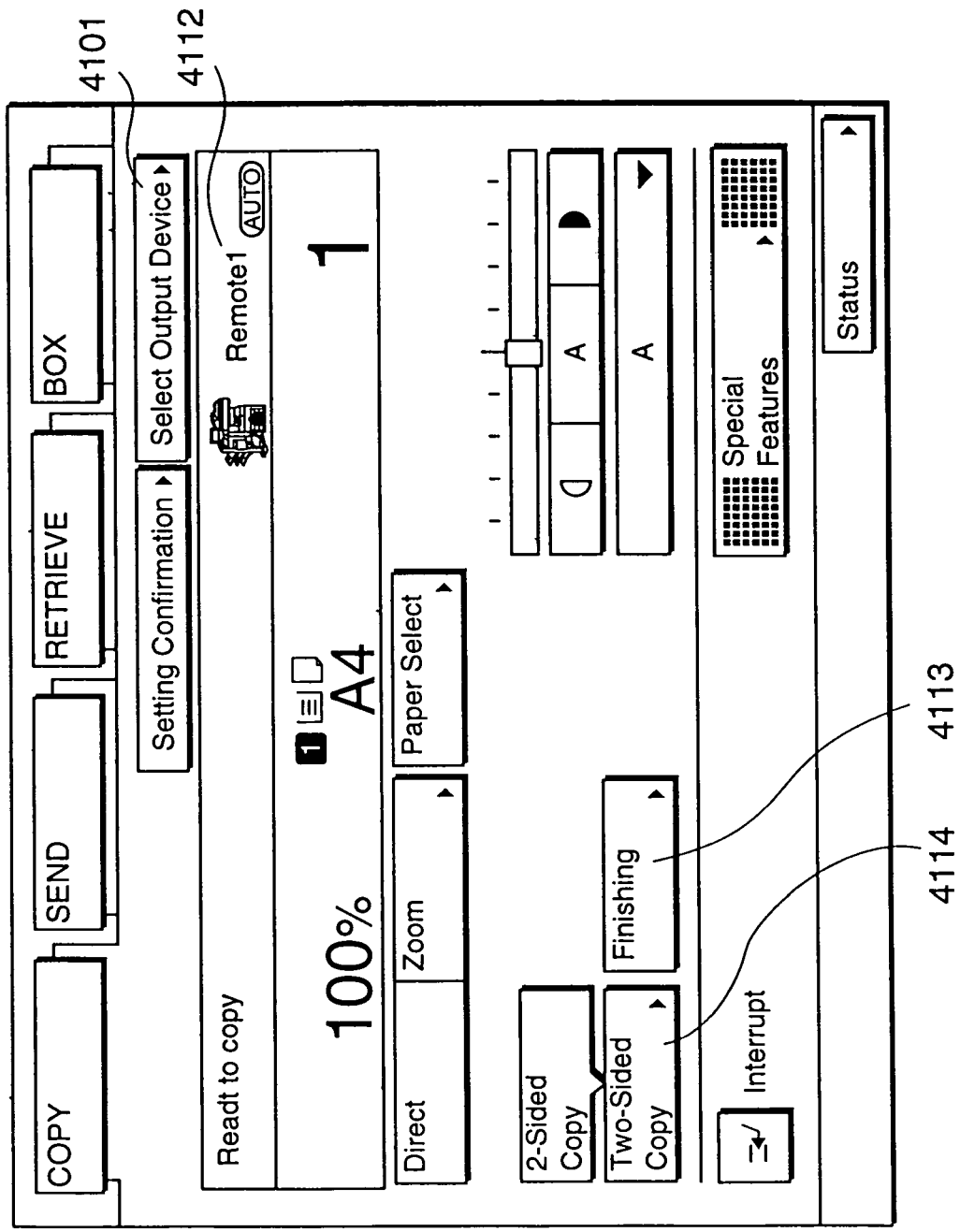
FIG. 16 is a view showing an example of a display screen displayed on the LCD 2013 when a two-sided copying function is set.
Figure 17:
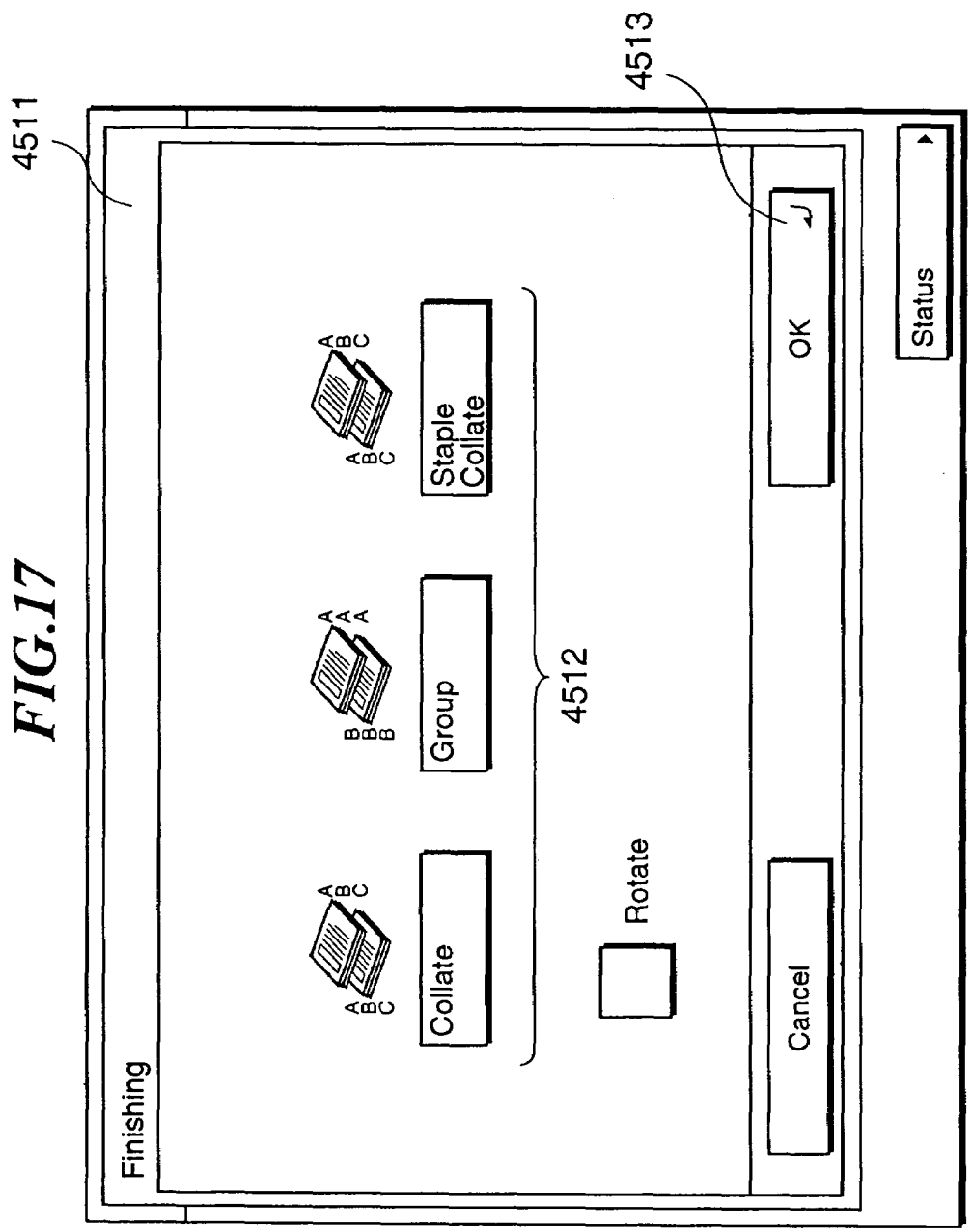
FIG. 17 is a view showing an example of a finishing function setting dialogue displayed on the LCD 2013.
Figure 18:
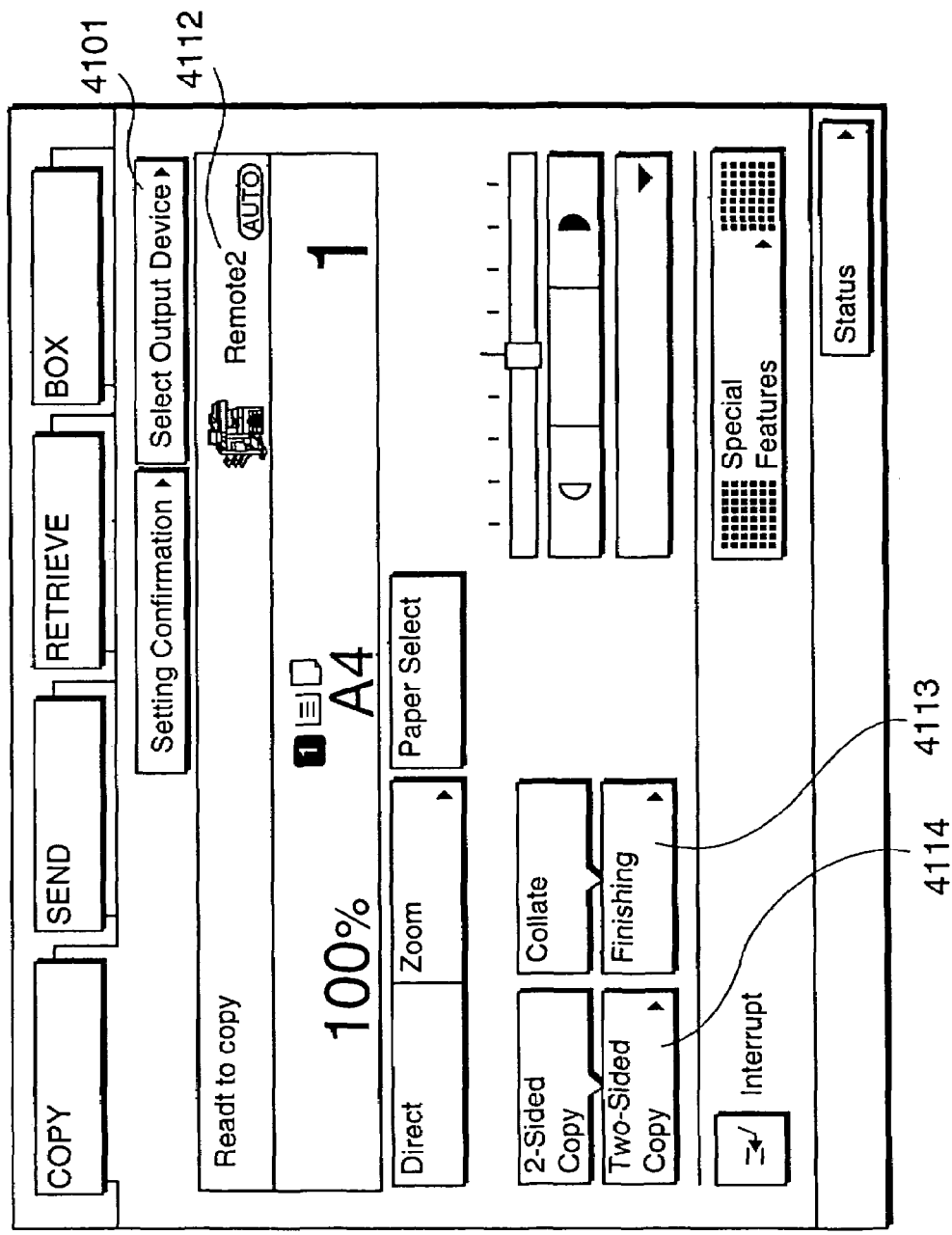
FIG. 18 is a view showing an example of a screen when the finishing function setting dialogue on the LCD 2013 is closed.
Figure 19:
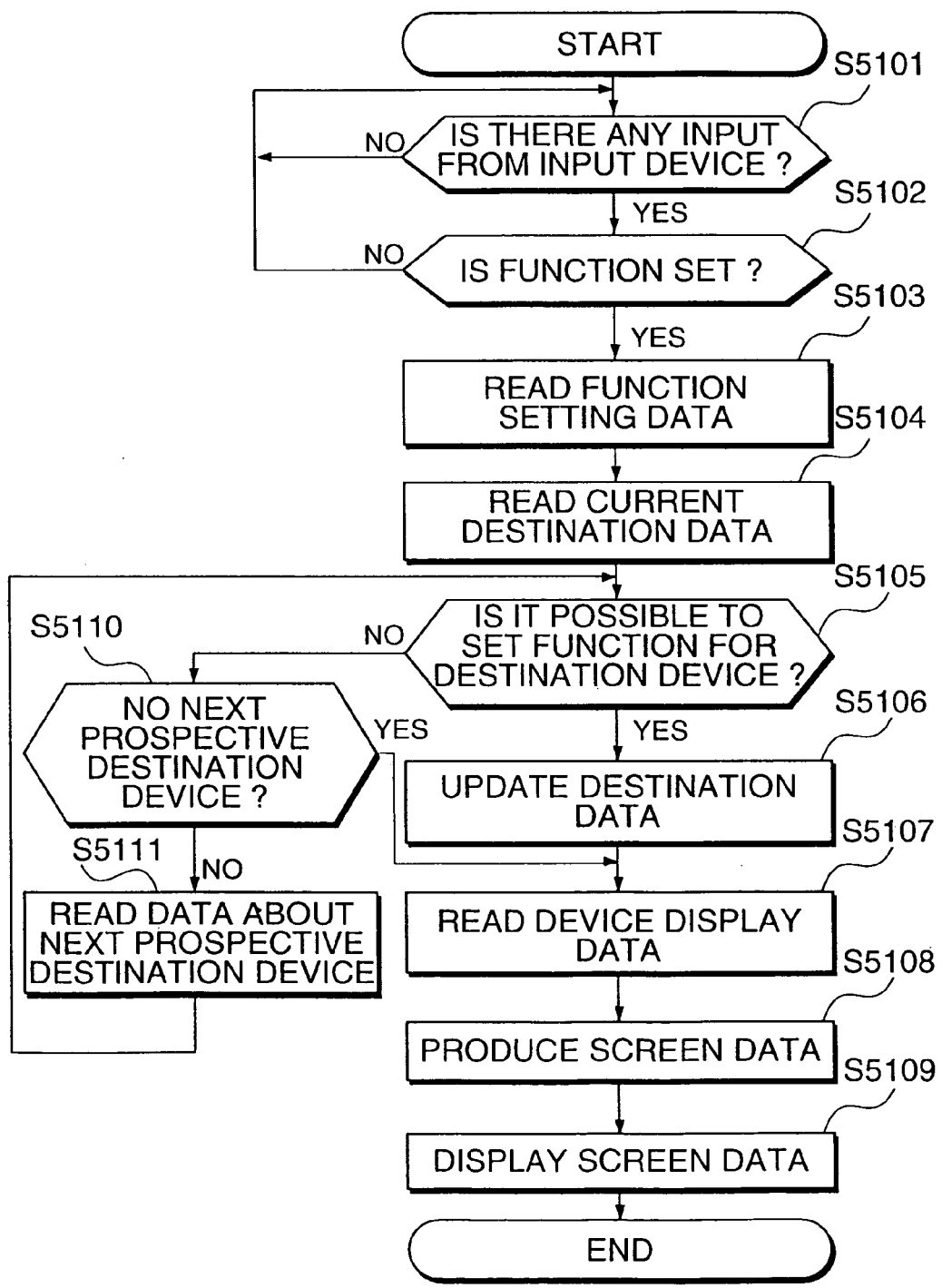
FIG. 19 is a flow chart showing a procedure for displaying an operating screen of the image forming system according to the second embodiment.

Referring next to FIGS. 13-19, there will be described a second embodiment of the present invention. FIG. 13 is a diagram showing a function block for setting functions of an image forming system according to a second embodiment of the present invention, FIG. 14 is a view showing an example of an initialization screen displayed on an LCD 2013 of the image forming system according to the second embodiment of the present invention, FIG. 15 is a view showing an example of a two-sided copying function setting dialogue displayed on the LCD 2013, FIG. 16 is a view showing an example of a display screen displayed on the LCD 2013 when a two-sided copying function is set, FIG. 17 is a view showing an example of a finishing function setting dialogue displayed on the LCD 2013, FIG. 18 is a view showing an example of a screen when the finishing function setting dialogue on the LCD 2013 is closed, and FIG. 19 is a flow chart showing the procedure for displaying an operating screen of the image forming system according to the second embodiment of the present invention.

The present embodiment has basically the same structure as the previously-described first embodiment, and thus, the basic structure of the present embodiment will not be described hereinbelow. An operating screen displaying process for setting the functions relating to the image formation is executed in the present embodiment. In the operating screen displaying process, if the automatic destination device selecting mode is designated, one of image forming device(s), that are able to execute the function(s) set on the operating screen, is selected according to priority information and device data 5010. Information about the selected image forming device is displayed on the operating screen.

As shown in FIG. 13, the function block for executing the operating screen displaying process has an input determining part 4001 for calculating coordinates corresponding to the depressed position on an operating screen displayed on the LCD 2013, i.e., the depressed position on the touch panel 2019, and determining information indicated by the depressed position on the touch panel 2019 according to the calculated coordinates with reference to screen coordinate data 4005. For example, the input determining part 4001 determines whether the destination device for the image is designated or the command to display the paper size selecting screen is given according to the depressed position of the touch panel 2019. The screen coordinate data 4005 is provided for each operating screen, and is stored in the HDD 2004.

Information representing the predetermined determination results of the input determining part 4001 is inputted to a destination device determining part 4002. The destination device determining part 4002 selects a device that is able to realize the currently-designated functions, according to the information representing the predetermined determination results of the input determining part 4001, destination data/function setting data 4006 and device data 4010 relating to the functions for each destination device. The destination data/function setting data 4006 include data indicative of priority of each device, data indicative of the currently-set data, and data specifying devices that are able to realize the currently-set functions. The destination data/function setting data 4006 and the device data 4010 are stored in the HDD 2004.

Information indicating the destination device selected by the destination device determining part 4002 is inputted to a screen forming part 4003. The screen forming part 4003 produces a display screen by combining the inputted information about the destination device and actual screen data 4007. The produced display screen is displayed on the LCD 2013 under the control of a screen display control part 4004.

A device data updating part 4009 updates the device data 4010 to the newest data whenever necessary. The device data updating part 4009 acquires information from the devices (remote devices) on the LAN 2011 and the local device whenever necessary, and updates the device data 4010 according to the acquired information. The remote devices correspond to the image forming devices 220, 230, and the local device corresponds to the image forming device 200.

Referring next to FIGS. 14-18, there will be described an example of the display screen displayed as a result of the operating screen displaying process for setting the functions relating to the image formation in the automatic destination device selecting mode.

Here, a description will be given of the case where the destination device for the image inputted through the scanner 2070 is designated in the image forming device 200. As shown in FIG. 14, the operating screen is displayed on the LCD 2013 of the operating part 2012 of the image forming device 200, and the operating screen shows a destination device designating dialogue display key 4101 for displaying a dialogue for designating a destination device that should output the image inputted through the scanner 2070 of the image forming device 200. When the automatic destination device selecting mode for automatically selecting and designating the destination device is set on the operating screen as a default or by a designating operation, described later, character information "AUTO" representing the setting of the automatic destination device selecting mode is displayed at a destination device display part 4112. Information indicating the currently-selected destination device is also displayed at the destination device display part 4112. In the present embodiment, information indicating that a device, which is currently selected as the destination device, is "local", is displayed at the destination device display part 4112. The operating screen also shows a finishing function setting dialogue display key 4113 for displaying a dialogue for designating a process such as sorting and stapling with respect to paper outputted from the destination device, and a two-sided copying function setting dialogue display key 4114 for displaying a dialogue for designating a two-sided copy.

When the destination device designating dialogue display key 4101 is depressed on the operating screen, a destination device designating dialogue 4301 in FIG. 9 is displayed. For example, a list of destination device designating fields 4302, 4303, 4304 is displayed in the destination device designating dialogue 4301. The name, the status, the output performance, etc. of destination devices are written in the destination device designating fields 4302, 4303, 4304. The destination device designating fields 4302, 4303, 4304 have different background colors so that the currently-selected destination device can be distinguished from the other devices. If the automatic destination device selecting mode is set by operating a destination device automatic selecting mode setting key (Auto) 4305 and the currently-set function can be executed by the devices indicated in the destination device designating fields 4302, 4303, 4304, the devices in the destination device designating fields 4302, 4303, 4304 are displayed in order of priority from the top of the screen. Therefore, even if a plurality of devices are able to execute the same function, it is possible to easily select one device for executing the set function by prioritizing the devices.

The following cases will now be described.
- The local device (image forming device 200) cannot execute the two-sided copying function or the finishing function.
- The remote device 1 (image forming device 220) can execute the two-sided copying function, but cannot execute the finishing function.
- The remote device 2 (image forming device 230) can execute both the two-sided copying function and the finishing function.
- The local device (image forming device 200), the remote device 1 (image forming device 220) and the remote device 2 take the first, second and third priorities, respectively.

For example, a two-sided copying function setting dialogue 4311 in FIG. 15 is displayed when a two-sided copying function setting dialogue display key (Two-Sided Copy) 4114 is depressed in order to designate the two-sided copying function in the automatic destination device selecting mode. Keys 4312 for selecting a desired two-sided copying function among plural kinds of two-sided copying functions and a key 4313 for fixing the selected two-sided copying function are displayed in the two-sided copying function setting dialogue 4311.

If a key for designating the two-sided copying function for performing a print from two sides to one side is depressed in the keys 4312 and the key 4313 is depressed to fix the two-sided copying function for performing the print from both sides to one side, the two-sided copying function setting dialogue 4311 is closed so that a screen in FIG. 16 is displayed. On the screen, information indicating a device selected as the destination device that is able to execute the currently-set function is displayed at the destination device display part 4112, and information indicating the selected two-sided copying function is displayed correspondingly to the two-sided copying function setting dialogue display key 4114. In this example, the remote device 1 (image forming device 220) is selected to execute the selected two-sided copying function according to the function and the priority.

Then, if the finishing function setting dialogue display key 4113 is depressed on the screen in FIG. 16, a finishing function setting dialogue 4511 in FIG. 17 for designating a process such as sorting and stapling with respect to paper outputted by the above-mentioned selected two-sided copying function is displayed. Keys 4512 for selecting each finishing function and a key 4513 for fixing the selected finishing function are displayed in the finishing function setting dialogue 4511.

If a key for designating a sorting function (collate) with respect to the outputted paper is depressed in the keys 4512 and then the key 4513 is depressed to fix the sorting function, the finishing function setting dialogue 4511 is closed so that a screen in FIG. 18 is displayed. On the screen, information indicating the device selected as a destination device that is able to execute the currently-set function(s) is displayed at the destination device display part 4112, and information indicating the selected sorting function is displayed correspondingly to the finishing function setting dialogue display key 4113. In this example, the remote device 2 (the image forming device 230) is selected according to the function(s) and the priority.

Referring next to FIG. 19, there will be described the operating screen displaying process.

The following description refers to operations related to or caused by operation of keys which are concerned with the present invention, while description of operations related to or caused by operation of the other keys is omitted.

First, an inputting operation through the touch panel 2019 on the currently-displayed operating screen is waited for in a step S5101. The automatic destination device selecting mode has already been designated before the display of the operating screen. Upon the inputting operation through the touch panel 2019, the process goes to a step S5102 to determine whether the setting of the function is designated or not according to the depressed position on the touch panel 2019 on the currently-displayed operating screen (FIG. 15 or FIG. 17). If the setting of the function is designated, the process goes to a step S5103 to read data representing the designated function and read function setting data about the currently-set functions and priority information about devices from destination data/function setting data 4006.

Then, the process goes to a step S5104 where the device data of the device selected currently as the destination device is read from the device data 4010. In a next step S5015, it is determined whether the designated function can be set for the currently-selected device or not. If yes, the process goes to a step S5106.

In the step S5106, the currently-selected device is specified as the currently-selected device, and the destination data/function setting data 4006 is rewritten so as to set the designated function. In a next step S5107, screen data for displaying the currently-selected device is read from the screen data 4007. Then, screen data as shown in FIG. 16 or 18 is produced in a step S5108.

Then, the process goes to a step S5109 where the produced screen data is displayed on the LCD 2013, followed by terminating the process.

If it is determined in the step S5105 that the designated function cannot be set for the currently-selected device, the process goes to a step S5110 to determine whether or not there is a next prospective destination device, which is the second highest in priority. If yes, the process goes to a step S5111 to read device data about the next prospective destination device from the device data 4010. Then, the process goes to a step S5016 via the step S5105 where if the designated function and the currently-set functions can be set for the next prospective destination device, the destination data/function setting data 4006 is rewritten so as to renew the currently-selected device.

In a next step S5107, screen data for displaying the prospective destination device is read from the screen data 4007. Then, the screen data in FIG. 16 or 18 is produced in the step S5108.

Then, the process goes to the step S5109 to display the produced screen data on the LCD 2013, followed by terminating the process.

If it is determined in the step S5110 that there is no next prospective destination device, the process goes to the step S5107 without rewriting data representing the currently-selected device. At this time, a screen, which informs the user that there is no prospective destination device and the function cannot be set, is displayed although this is not shown in this example.

According to the present embodiment, if the automatic destination device selecting mode is designated, the image forming device that is able to execute the function(s) set on the operating screen is selected as the destination device according to the priority information, and the information about the selected image forming device is displayed on the operating screen. This enables the user to set the function while regularly confirming the destination device, and this significantly improves the operability in setting the functions relating to the image formation in the automatic destination device selecting mode.

Third Embodiment

Figure 20:
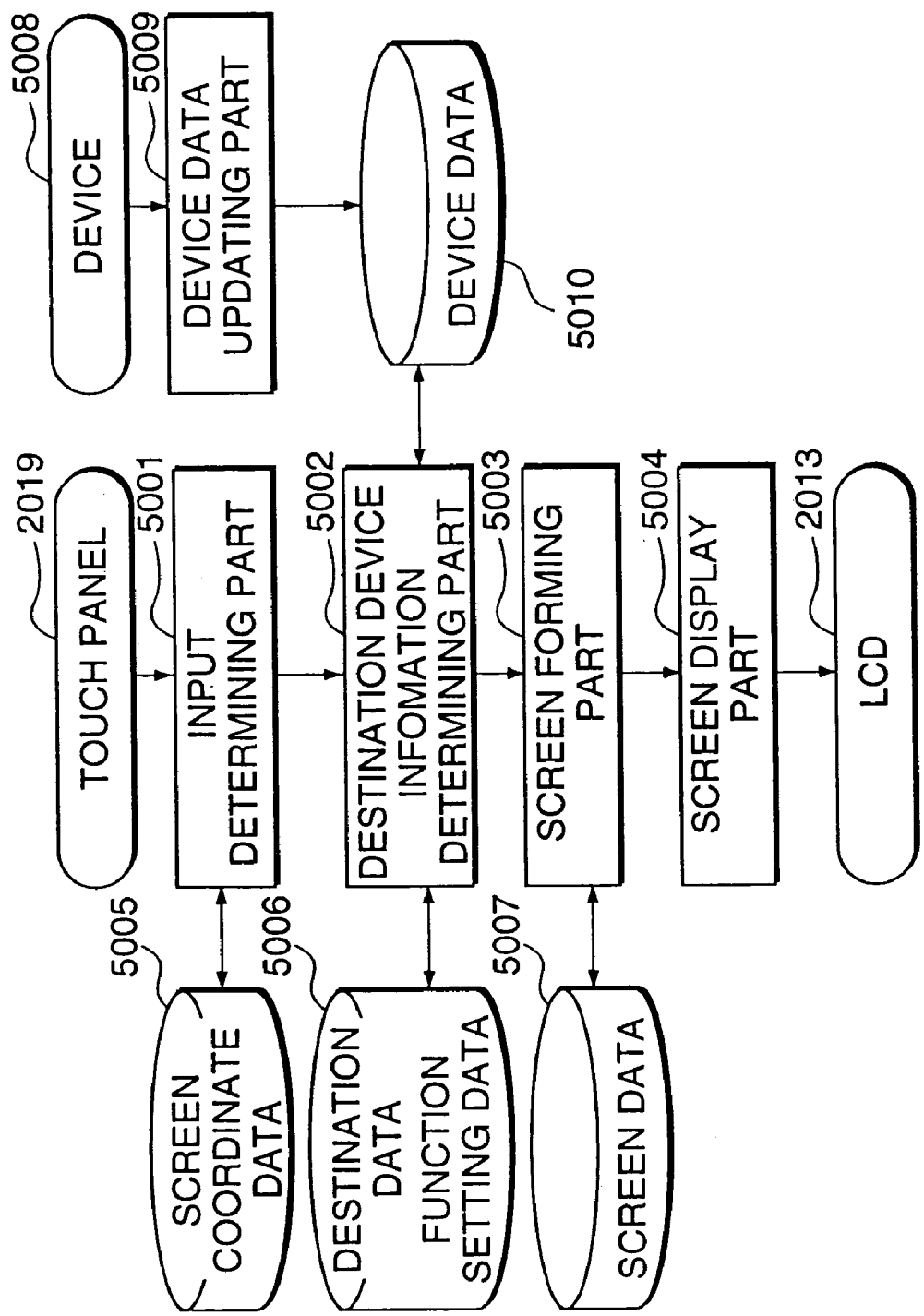
FIG. 20 is a diagram showing a function block for setting functions of an image forming system according to a third embodiment of the present invention.
Figure 21:
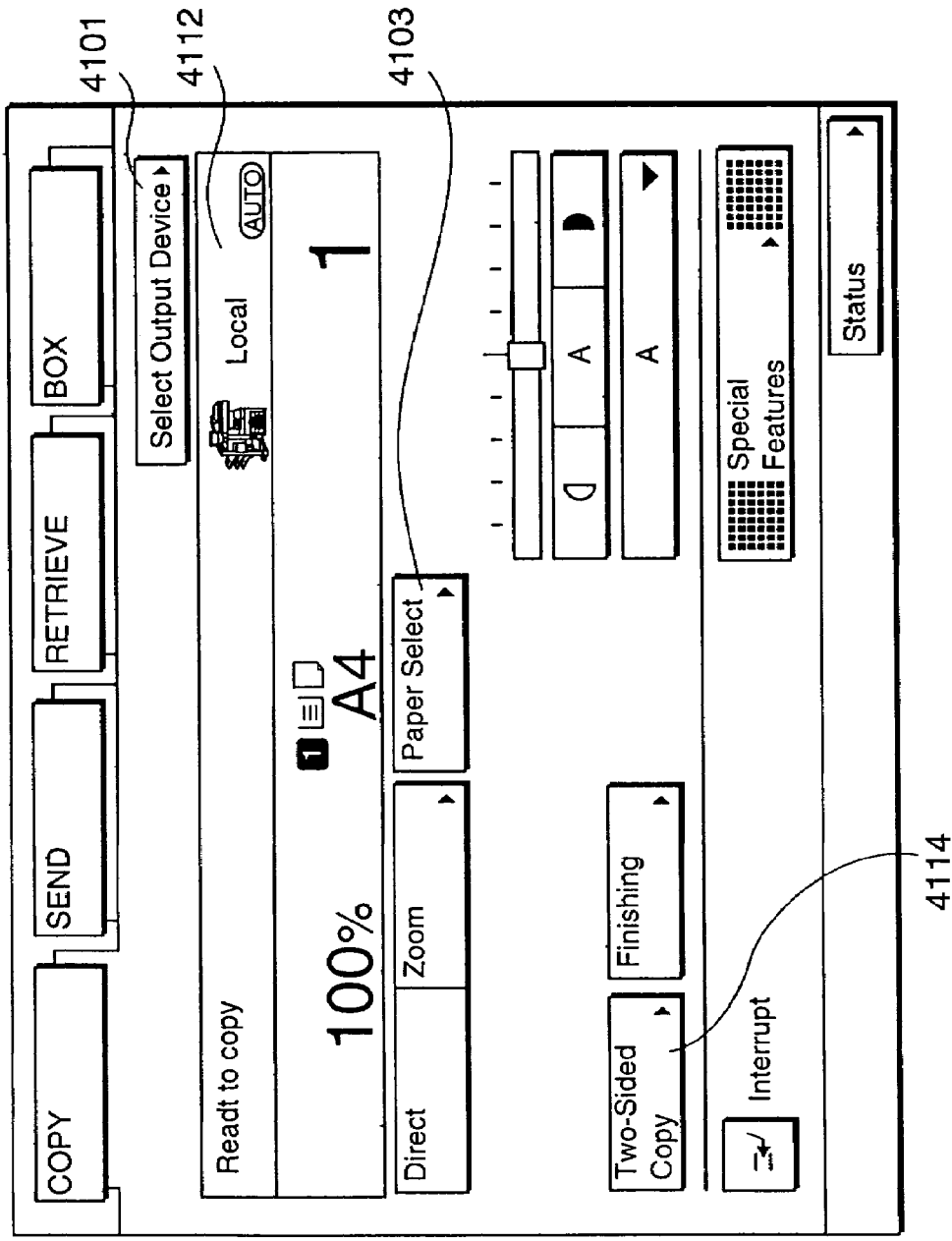
FIG. 21 is a view showing an example of an operating screen displayed on an LCD 2013 of the image forming system according to the third embodiment.
Figure 22:
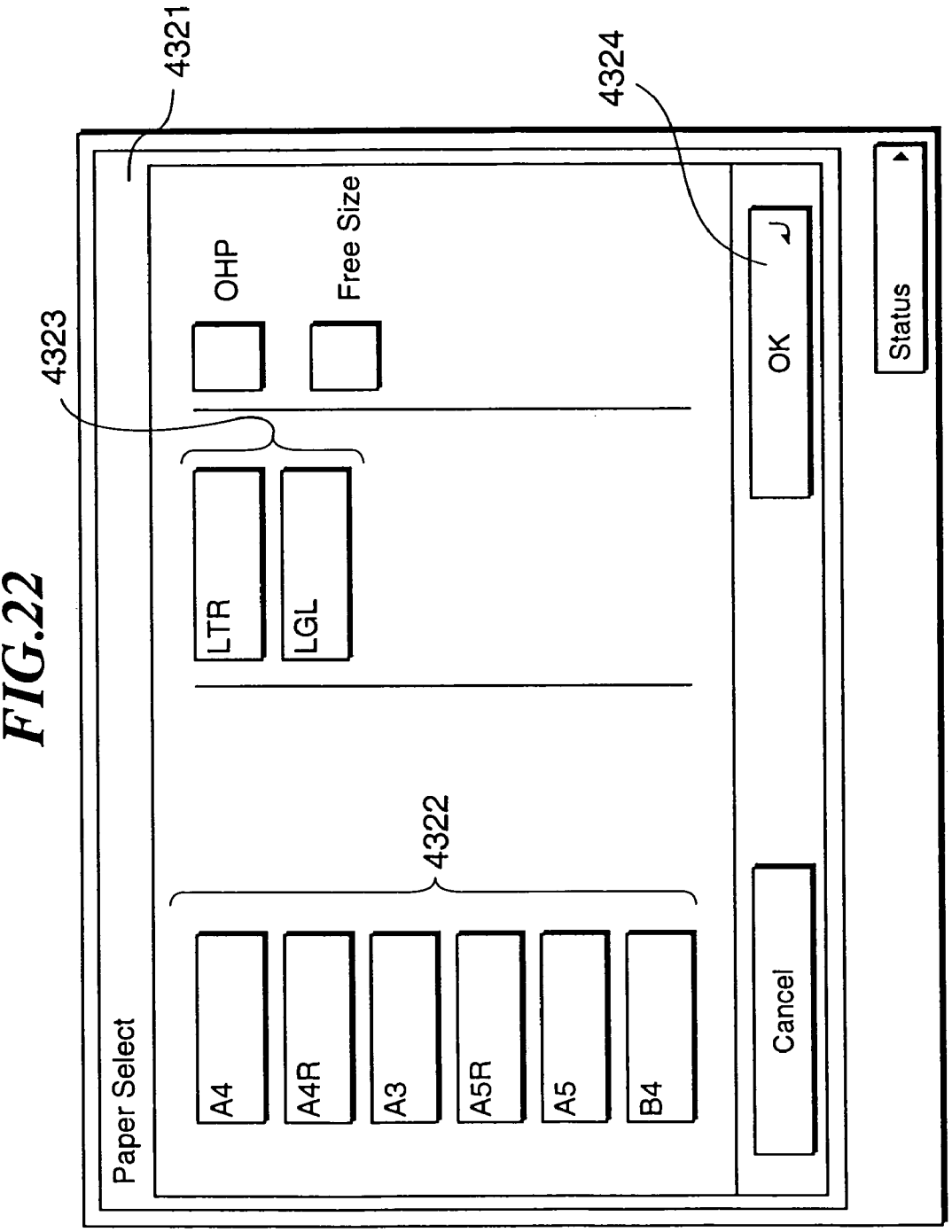
FIG. 22 is a view showing an example of a paper selecting screen displayed on the LCD 2013.
Figure 23:
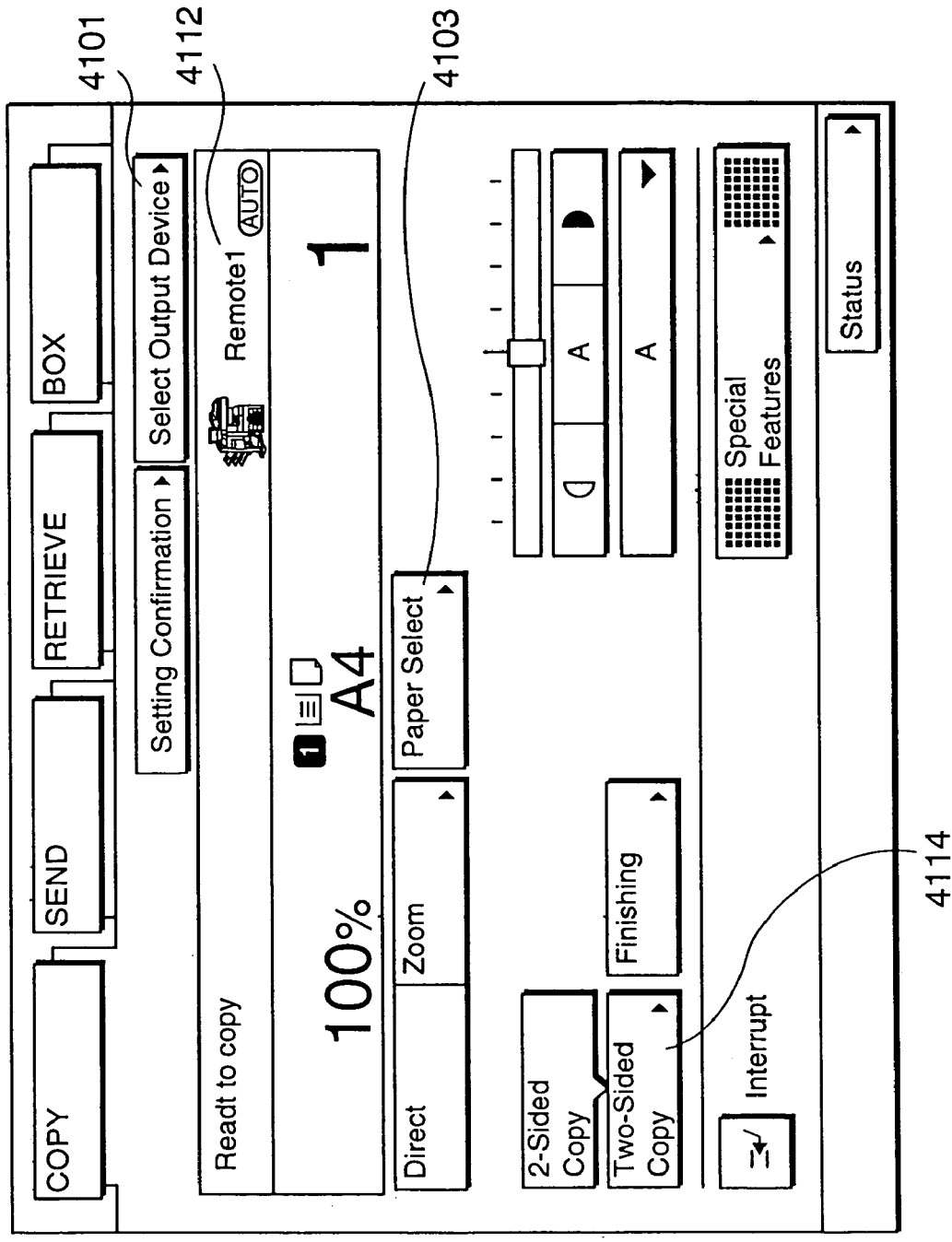
FIG. 23 is a view showing an example of a display screen displayed on the LCD 2013 when the two-sided copying function is set.
Figure 24:
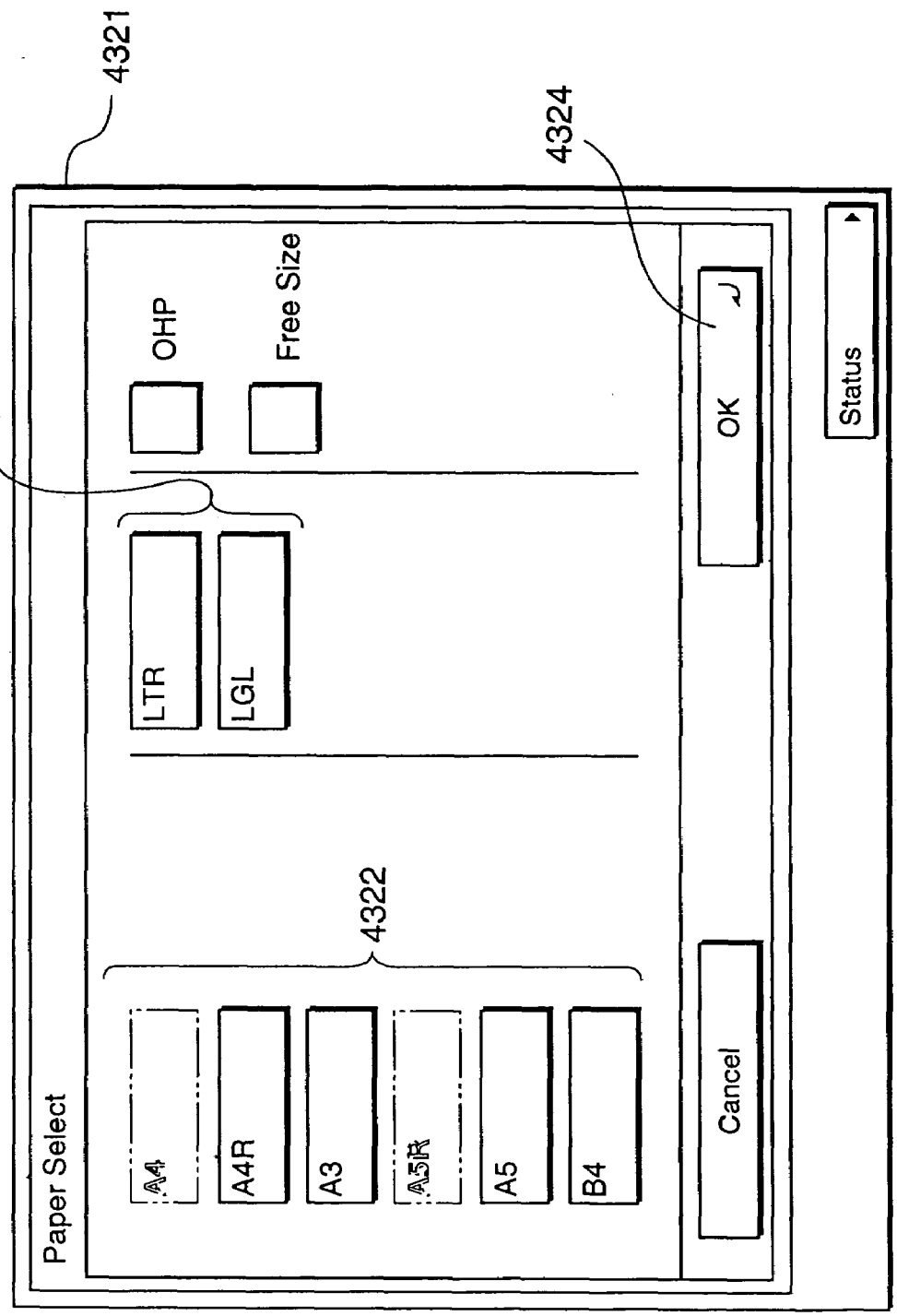
FIG. 24 is a view showing an example of a paper selecting screen displayed on the LCD 2013 when the two-sided copying function is set.
Figure 25:
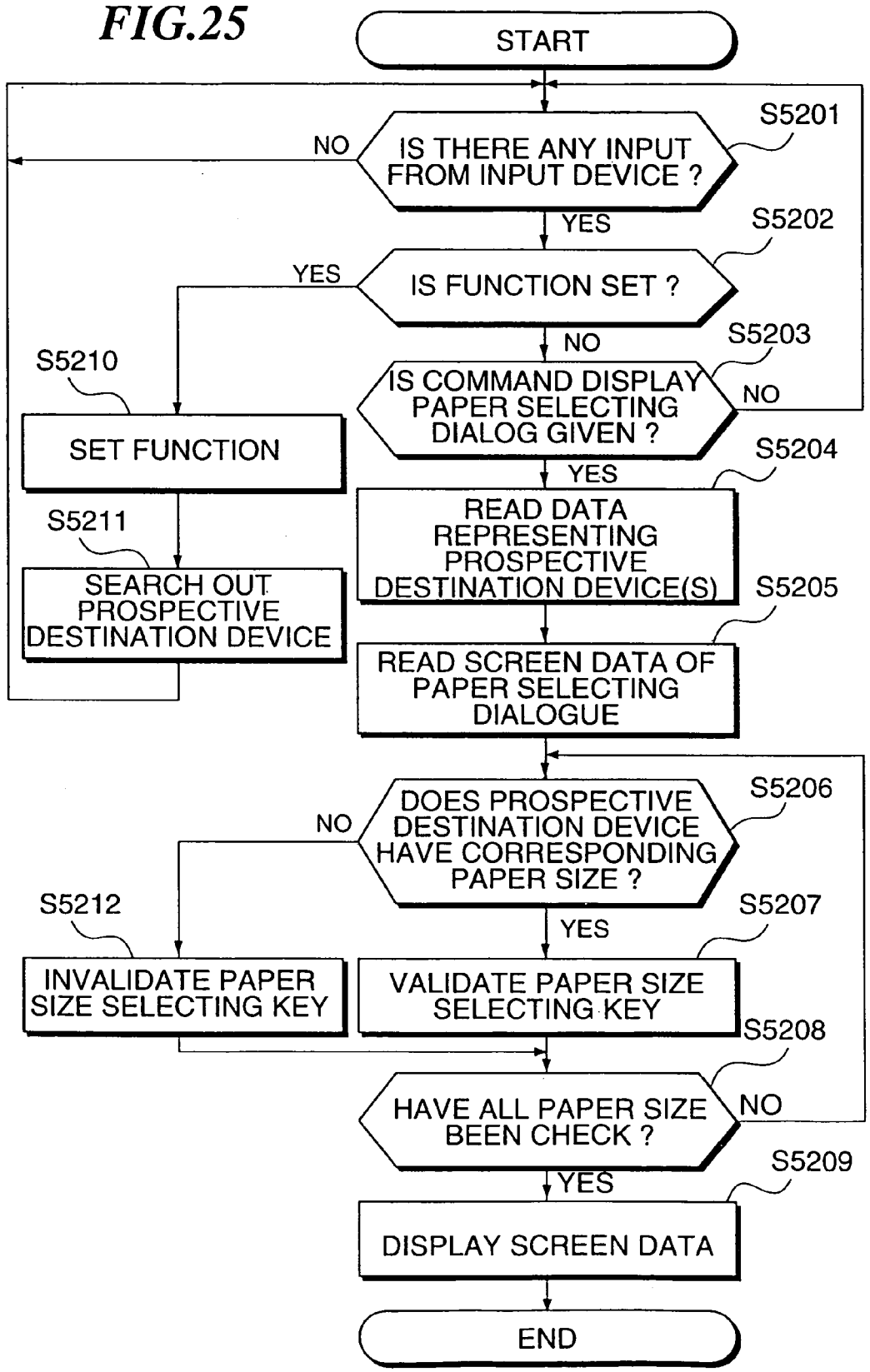
FIG. 25 is a flow chart showing a procedure for displaying an operating screen of the image forming system according to the third embodiment.

Referring next to FIGS. 20-25, there will be described a third embodiment of the present invention. FIG. 20 is a diagram showing a function block for setting functions of an image forming system according to the third embodiment of the present invention, FIG. 21 is a view showing an example of an operating screen displayed on the LCD 2013 of the image forming system according to the third embodiment, FIG. 22 is a view showing an example of a paper selecting screen displayed on the LCD 2013, FIG. 23 is a view showing an example of a display screen displayed on the LCD 2013 when the two-sided copying function is set, FIG. 24 is a view showing an example of the paper selecting screen displayed on the LCD 2013 when the two-sided copying function is set, and FIG. 25 is a flow chart showing the procedure for displaying the operating screen of the image forming system according to the third embodiment.

The present embodiment has basically the same structure as the previously-described first embodiment, and the basic structure of the present embodiment will not be described hereinbelow. According to the present embodiment, if the automatic destination device selecting mode is designated, image forming device(s) that are able to execute the currently-set function(s) are sampled according to function information of each device stored in advance. An operating screen displaying process for displaying function information relating to the sampled image forming device is performed in the present embodiment. When the function information relating to the sampled destination image forming device(s) is displayed, it is only possible to designate the functions that can be executed by the sampled image forming device(s).

As shown in FIG. 20, the function block for executing the operating screen displaying process has an input determining part 5001, which calculates coordinates corresponding to the depressed position on the operating screen displayed on the LCD 2013, i.e., the depressed position on the touch panel 2019, and which determines information indicated by the depressed position on the touch panel 2019 according to the calculated coordinates with reference to screen coordinate data 5005. For example, the input determining part 5001 determines whether a destination device for the image is designated or a command to display a paper size selecting screen is given according to the depressed position on the touch panel 2019. The screen coordinate data 5005 is provided for each operating screen, and is stored in the HDD 2004.

Information indicating the predetermined determination results of the input determining part 5001 is inputted to a destination device information determining part 5002. The destination device information determining part 5002 retrieves device(s) that are able to execute the currently-set function(s) according to the information indicating the predetermined determination results of the input determining part 5001, destination data function setting data 5006 and device data 5010 about the functions for each destination device. The destination device information determining part 5002 also recognizes the function(s) that can be set for the retrieved device(s). The destination data/function setting data 5006 and the device data 5010 are stored in the HDD 2004.

Information indicating the destination device(s) retrieved by the destination device information determining part 5002 and the function(s) that can be set is inputted to a screen forming part 5003. The screen forming part 5003 produces a display screen by combining information indicating the inputted destination device(s) and the function(s) that can be set and actual screen data 5007. The produced display screen is displayed on the LCD 2013 under the control of a screen display control part 5004.

A device data updating part 5009 updates the device data 5010 to the newest data whenever necessary. The device data updating part 5009 acquires information from the devices (remote devices) on the LAN 2011 and the local device whenever necessary, and updates the device data 5010 according to the acquired information. The remote devices correspond to the image forming devices 220, 230, and the local device corresponds to the image forming device 200.

Referring next to FIGS. 21-24, there will be described an example of the display screen displayed as a result of an operating screen displaying process for setting the functions relating to the image formation in the automatic destination device selecting mode.

Here, a description will be given of the case where the destination device for the image inputted through the scanner 2070 is designated in the image forming device 200. As shown in FIG. 21, the operating screen is displayed on the LCD 2013 of the operating part 2012 of the image forming device 200, and the operating screen shows a destination device designating dialogue display key 4101 for displaying a dialogue for designating a destination device that should output the image inputted through the scanner 2070 of the image forming device 200. When the automatic destination device selecting mode for automatically selecting and designating the destination device is set on the operating screen as a default or by a designating operation described with respect to the first embodiment, character information "AUTO" representing the setting of the automatic destination device selecting mode is displayed at a destination device display part 4112. Information indicating the currently-selected destination device is also displayed at the destination device display part 4112. In this example, information indicating that a device which is currently selected as the destination device, is "local" is displayed at the destination device display part 4112. The operating screen also shows a paper selecting dialogue display key 4103 for designating paper, and the two-sided copying function setting dialogue display key 4114 for displaying the dialogue for designating the two-sided copy.

If, for example, the paper selecting dialogue display key 4103 is depressed in order to designate the paper selection in the automatic destination device selecting mode, a paper selecting dialogue display key 4103 in FIG. 22 is displayed. The paper selecting dialogue 4321 displays paper selecting keys corresponding to paper sizes obtained from the logical sums of the sizes of papers contained in the paper cassettes of devices that are able to output the image inputted from the image forming device 200. The devices that are able to output the image from the image forming device 200 are the image forming device 200, the image forming device 220 and the image forming device 230. The logical sums of the paper sizes of these image forming devices are found and paper selecting keys 4322, 4323 corresponding to the paper sizes obtained from the found logical sums are displayed.

By depressing one of the paper selecting keys 4322, 4323, which corresponds to a desired paper size in the paper selecting key, the user can select the desired paper selecting key without paying any attention to the destination device. On the selection of the paper size, when a paper size fixing key (Done) 4324 is depressed, the paper selecting dialogue 4321 is closed and the selected paper size is fixed. Then, in response to depressing the start key 2014, the image inputted through the scanner 2070 is transferred to the image forming device that has the printer containing paper the fixed paper size. The printer of the image forming device, to which the image has been transferred, forms the image on the paper in the designated size.

The following cases will now be described.
The two-sided copying function or the finishing function cannot be set for the local device (image forming device 200).
The two-sided copying function can be set for the remote device 2 (image forming device 220), but the finishing function cannot be set for the remote device 2.
Both the two-sided copying function and the finishing function can be set for the remote device 2 (image forming device 230).
The local device (image forming device 200), the remote device 1 (image forming device 220) and the remote device 2 (image forming device 230) take the first, second and third priorities, respectively.
For example, the two-sided copying function setting dialogue 4311 in FIG. 15 is displayed when the two-sided copying function setting dialogue display key (Two-Sided Copy) 4114 is depressed in order to designate the two-sided copying function in the automatic destination device selecting mode. If the key for designating the two-sided copying function for performing a print from two sides to one side is depressed in the keys 4312 and the key 4313 is depressed, the two-sided copying function for printing from both sides to one side is fixed. Then, the two-sided copying function setting dialogue 4311 is closed so that a screen in FIG. 23 is displayed. On the screen, information indicating a device selected as the destination device that is able to execute the currently-selected function and has the highest priority is displayed at the destination device display part 4112, and information indicating the selected two-sided copying function is displayed correspondingly to the two-sided copying function setting dialogue display key 4114. The paper selecting dialogue display key 4103 is also displayed on the screen. In this example, the remote device 1 (image forming device 220) is selected to execute the selected two-sided copying function according to the function and the priority.

Then, if the paper selecting dialogue display key 4103 is depressed on the screen in FIG. 23, the screen is closed so that a screen in FIG. 24 for selecting the paper size to be outputted by the selected two-sided copying function is displayed. On the screen in FIG. 24, the paper selecting keys 4322, 4323 are displayed in the same arrangement as on the screen in FIG. 22. Since the destination devices, for which the two-sided copying function can be set, are the remote device 1 (image forming device 220) and the remote device 2 (image forming device 230), the logical sums of paper sizes of these devices are found, and only the paper selecting keys corresponding to the paper sizes obtained from the found logical sums are displayed in such a manner that they can be selected.

More specifically, the paper selecting keys corresponding to the paper sizes A4R, A3, A5, B4, LTR and LGL that can be selected by the remote devices 1, 2 are displayed in such a manner that they can be selected, and the paper selecting keys corresponding to A4 and A5R are displayed in such a manner that they cannot be selected.

Referring next to FIG. 25, there will be described the operating screen displaying process. First, an inputting operation through the touch panel 2019 on the currently-displayed operating screen is waited for in a step S5201. The automatic destination device selecting mode has already been selected before the display of the operating screen. Upon the inputting operation through the touch panel 2019, the process goes to a step S5202 to determine whether there is a command to set the function according to the depressed position on the touch panel 2019 on the currently-displayed operating screen. If there is the command to set the function, the process goes to a step S5210 to set the designated function and update destination device data/function setting data 5006. In a next step S5211, device(s) that are able to execute the set function(s) are searched out, and data indicating the searched-out devices is stored in the destination data/function setting data 5006. Then, the process returns to the step S5201.

If it is determined in the step S5202 that there is no command to set the function, the process goes to a step S5203 to determine whether there is a command to display the paper selecting dialogue. If there is no command to display the paper selecting dialogue, the process returns to the step S5201. If there is the command to display the paper selecting dialogue, the process goes to a step S5204 to read the data representing prospective destination device(s) that are able to execute the currently-set function(s) from the destination data/function setting data 5006. Then, paper data about the prospective destination device(s) is read from the device data 5010. In a next step S5205, screen data of the paper selecting dialogue is read from screen data 5070.

Then, the process goes to a step S5206 to determine whether the prospective destination device(s) have the paper corresponding to the paper size selecting key displayed in the paper selecting dialogue. If the prospective destination device(s) have the paper corresponding to the paper size selecting key displayed in the paper selecting dialogue, the process goes to a step S5207 to validate this paper size selecting key, i.e. set the paper size selecting key in such a manner that it can be selected. If the prospective destination device(s) do not have the paper corresponding to the paper size selecting key displayed in the paper selecting dialogue, the process goes to a step S5212 to invalidate the paper size selecting key that does not correspond to the paper in the prospective destination device(s), i.e. set the paper size selecting key in such a manner that it cannot be selected.

When the displayed paper size selecting key is validated or invalidated as mentioned above, the process goes to a step S5208 to determine whether all paper size selecting keys have already been validated or invalidated. If all paper size selecting keys have not yet been validated or invalidated, the process returns to the step S5206 again. If all paper size selecting keys have already been validated or invalidated, the process goes to a step S5209 to display the paper selecting dialogue including the paper size selecting keys according to the above setting, followed by terminating the process.

In the present embodiment, if the automatic destination device selecting mode is designated, the image forming device as the destination device that is able to execute the currently-set function(s) is sampled according to the function information registered in advance. The information about the functions relating to the image formation of the sampled image forming device(s) is displayed on the operating screen, and only the functions that can be executed by the destination image forming device(s) are made settable when the information about the sampled destination image forming device(s) is displayed. This makes it possible to recognize the functions that cannot be set according to the combination of the functions, thus avoiding incorrect setting or the like. This significantly improves the operability in setting the functions relating to the image formation in the automatic destination device selecting mode.

It is to be understood that the present invention may also be realized by supplying a system or an apparatus with a storage medium in which the program code of software that realizes the functions of the above described operations (for example, the operations as shown in FIGS. 6 to 25, etc.) of the present embodiments is recorded, and causing a computer (or CPU, MPU) of the system or apparatus to read out and execute the program code stored in the storage medium.

In this case, the program code itself read out from the storage medium realizes the above described functions of the present embodiments, so that the storage medium storing the program code also constitutes the present invention.

Although the first to third embodiments have been described above as being separate from each other, they may be appropriately combined together.

The storage medium for supplying the program code may be selected from, for example, a floppy disk, hard disk, optical disk, magneto-optical disk, CD-ROM, CD-R, magnetic tape, non-volatile memory card, and ROM.

The functions of the above described embodiments may be accomplished not only by executing a program code read by a computer, but also by causing an operating system (OS) that operates on the computer, to perform a part or the whole of the actual operations according to instructions of the program code.

Furthermore, the program code read out from the storage medium may be written into a memory provided in an expanded board inserted in the computer, or an expanded unit connected to the computer, and a CPU, or the like, provided in the expanded board or expanded unit may actually perform a part or all of the operations according to the instructions of the program code, so as to accomplish the functions of the above described embodiments.

What is claimed is:

1. An image forming system which includes a plurality of image forming devices each having a reading unit that reads an image on a manuscript, and being connectable to one another through communication media, wherein one of an image forming device as a present image forming device and at least one other image forming device of said plurality of image forming devices can be selected as a destination device for formation of an image read by said reading unit of the present image forming device, said image forming devices each comprising:
   a display unit that displays a destination device designating screen for designating the destination device;
   a display control unit that controls said display unit in such a manner as to display a list of device names given respectively to said image forming devices on the destination device designating screen;
   a selecting unit that selects as the destination device one of said image forming devices corresponding to a device name designated according to an inputting operation on the destination device designating screen;
   a transmitting unit that, when the other image forming device is selected as the destination device by said selecting unit, transmits the image read by said reading unit through said communication media to the selected other image forming device; and
   an input unit that inputs the image read by said reading unit to the present image forming device, when the present image forming device is selected as the destination device by said selecting unit.

2. An image forming system according to claim 1, wherein said display control unit controls said display unit in such a manner as to display the device name of the present image forming device in a manner distinguishable from the device name of the other image forming device on the destination device designating screen.

3. An image forming system according to claim 1, wherein the device names of said image forming devices in the list are displayed according to priorities given respectively to said image forming devices.

4. An image forming system according to claim 3, wherein the device names of said image forming devices in the list are displayed in order from a top of the destination device designating screen according to priorities given respectively to said image forming devices.

5. An image forming system according to claim 1, wherein said display control unit controls said display unit in such a manner as to display statuses of said image forming devices in association with the device names of said image forming devices on the destination device designating screen.

6. An image forming system according to claim 1, wherein said display control unit controls said display unit in such a manner as to display output performance of said image forming devices in association with the device names of said image forming devices on the destination device designating screen.

7. An image forming system which includes a plurality of image forming devices being connectable to one another, comprising:
   a destination device selecting unit that selects one of an image forming device as a present image forming device and at least one other image forming device of said plurality of image forming devices, as a destination device for formation of an image inputted from the present image forming device, according to an inputting operation by a user;
   a sheet-size selecting unit that selects a sheet size used for the formation of the image inputted by the present image forming device, according to an inputting operation by the user;
   a first inhibiting unit that inhibits said sheet-size selecting unit from selecting a sheet size, which cannot be provided by the image forming device selected as the destination device by said destination device selecting unit, as the sheet size used for the formation of the image inputted by the present image forming device; and
   a second inhibiting unit that inhibits said destination device selecting unit from selecting an image forming device, which cannot provide the sheet size selected by said sheet-size selecting unit, as the destination device.

8. An image forming system according to claim 7, further comprising a display unit that displays a destination device designating screen for designating an image forming device as the destination device, and a display control unit that controls said display unit in such a manner as to display a list of device names given respectively to said image forming devices on the destination device designating screen, and
   wherein said destination device selecting unit selects one of said image forming devices corresponding to the device name designated according to an inputting operation by the user on the destination device designating screen, as the destination device.

9. An image forming system according to claim 7, further comprising a display unit that displays a sheet-size designating screen for designating the sheet size used for the formation of the image inputted by the present image forming device, and a display control unit that controls said display unit in such a manner as to display a list of sheet sizes provided respectively by the present image forming device and the other image forming device on the sheet-size designating screen, and
   wherein said sheet-size selecting unit selects a sheet size designated according to an inputting operation by the user on the sheet-size device designating screen, as the sheet size used for the formation of the image inputted by the present image forming device.

10. An image forming system according to claim 8, wherein when a sheet size has been selected by said sheet-size selecting unit before an image forming device is selected as the destination device by said destination device selecting unit, said second inhibiting unit inhibits said display control unit from displaying the device name of the image forming device, which cannot provide the sheet size selected by said sheet-size selecting unit whereby said destination device selecting unit is inhibited from selecting the image forming device, which cannot provide the sheet size selected by said sheet-size selecting unit, as the destination device.

11. An image forming system according to claim 9, wherein when an image forming device has been selected as the destination device by said destination device selecting unit before a sheet size is selected by said sheet size selecting unit, said first inhibiting unit inhibits said display control unit from displaying the sheet size which cannot be provided by the image forming device selected as the destination device, whereby said sheet-size selecting unit is inhibited from selecting the sheet size, which cannot be provided by the image forming device selected as the destination device, as the sheet size used for the formation of the image inputted by the present image forming device.

12. An image forming system according to claim 7, wherein:
   when an image forming device has been selected as the destination device by said destination device selecting unit before a sheet size is selected by said sheet-size selecting unit, said first inhibiting unit inhibits said sheet-size selecting unit from selecting the sheet size, which cannot be provided by the image forming device selected as the destination device, as the sheet size used for the formation of the image inputted by the present image forming device,
   when a sheet size has been selected by said sheet-size selecting unit before an image forming device is selected as the destination device by said destination device selecting unit, said second inhibiting unit inhibits said destination device selecting unit from selecting the image forming device, which cannot provide the sheet size selected by said sheet-size selecting unit, as the destination device.

13. An image forming device that is connectable to at least one other image forming device through communication media, comprising:
   a reading unit that reads an image on a manuscript;
   a display unit that displays a destination device designating screen for designating one of the image forming device as a present image forming device and the other image forming device, as a destination device for formation of an image read by said reading unit;
   a display control unit that controls said display unit in such a manner as to display a list of device names of the present image forming device and the other image forming device, on the destination device designating screen;
   a selecting unit that selects as the destination device one of the present image forming device and the other image forming device corresponding to a device name designated according to an inputting operation by a user on the destination device designating screen;
   a transmitting unit that transmits the image read by said reading unit through the communication media to the other image forming device, when the other image forming device is selected as the destination device by said selecting unit; and
   an input unit that inputs the image read by said reading unit to the present image forming device, when the present image forming device is selected as the destination device by said selecting unit.

14. An image forming device according to claim 13, wherein said display control unit controls said display unit in such a manner as to display the device name of the present image forming device in a manner distinguishable from the device name of the other image forming device on said destination device designating screen.

15. An image forming device according to claim 13, wherein the device names of the present image forming device and the other image forming device in the list are displayed according to priorities given respectively to the present image forming device and the other image forming device.

16. An image forming system device to claim 15, wherein the device names of the present image forming device and the other image forming device in the list are displayed in order from a top of the destination device designating screen according to priorities given respectively to the present image forming device and the other image forming device.

17. An image forming device according to claim 13, wherein said display control unit controls said display unit in such a manner as to display statuses of the present image forming device and the other image forming device in association with the device names of the present image forming device and the other image forming device on the destination device designating screen.

18. An image forming device according to claim 13, wherein said display control unit controls said display unit in such a manner as to display output performance of the present image forming device and the other image forming device in association with the device names of the present image forming device and the other image forming device on the destination device designating screen.

19. An image forming device that is connectable to at least one other image forming device, comprising:
   a destination device selecting unit that selects one of the image forming device as a present image forming device and the other image forming device, as a destination device for formation of an image inputted by the present image forming device, according to an inputting operation by a user;
   a sheet-size selecting unit that selects a sheet size used for the formation of the image inputted by the present image forming device, according to an inputting operation by the user;
   a first inhibiting unit that inhibits said sheet-size selecting unit from selecting a sheet size which cannot be provided by the image forming device selected as the destination device, as the sheet size used for the formation of the image inputted by the present image forming device; and
   a second inhibiting unit that inhibits said destination device selecting unit from selecting an image forming device, which cannot provide the sheet size selected by said sheet-size selecting unit, as the destination device.

20. An image forming device according to claim 19, further comprising a display unit that displays a destination device designating screen for designating one of the present image forming device and the other image forming device as the destination device, and a display control unit that controls said display unit in such a manner as to display a list of device names of the present image forming device and the other image forming device on the destination device designating screen, and
   wherein said destination device selecting unit selects one of the present image forming device and the other image forming device corresponding to a device name designated according to an inputting operation by the user on the destination device designating screen, as the destination device.

21. An image forming device according to claim 19, further comprising a display unit that displays a sheet-size designating screen for designating the sheet size used for the formation of the image inputted from the present image forming device, and a display control unit that controls said display unit in such a manner as to display a list of sheet sizes provided respectively by the present image forming device and the other image forming device on the sheet-size designating screen, and wherein said sheet-size selecting unit selects a sheet size designated according to an inputting operation by the user on the sheet-size device designating screen, as the sheet size used for the formation of the image inputted from the present image forming device.

22. An image forming device according to claim 20, wherein when a sheet size has been selected by said sheet-size selecting unit before an image forming device is selected as the destination device by said destination device selecting unit, said second inhibiting unit inhibits said display control unit from displaying the device name of the image forming device, which cannot provide the sheet size selected by said sheet-size selecting unit, whereby said destination device selecting unit is inhibited from selecting the image forming device, which cannot provide the sheet size selected by said sheet-size selecting unit, as the destination device.

23. An image forming device according to claim 21, wherein when an image forming device has been selected as the destination device by said destination device selecting unit before a sheet size is selected by said sheet-size selecting unit, said first inhibiting unit inhibits said display control unit from displaying the sheet size which cannot be provided by the image forming device selected as the destination device, whereby said sheet-size selecting unit is inhibited from selecting the sheet size, which cannot be provided by the image forming device selected as the destination device, as the sheet size used for the formation of the image inputted from the present image forming device.

24. An image forming device according to claim 19, wherein: when an image forming device has been selected as the destination device by said destination device selecting unit before a sheet size is selected by said sheet-size selecting unit, said first inhibiting unit inhibits said sheet-size selecting unit from selecting the sheet size, which cannot be provided by the image forming device selected as the destination device, as the sheet size used for the formation of the image inputted from the present image forming device, when a sheet size has been selected by said sheet-size selecting unit before an image forming device is selected as the destination device by said destination device selecting unit, said second inhibiting unit inhibits said destination device selecting unit from selecting the image forming device, which cannot provide the sheet size selected by said sheet-size selecting unit, as the destination device.

25. A method of controlling an image forming system which comprises a plurality of image forming devices having a reading unit that reads an image on a manuscript and being connectable to one another through communication media, wherein one of an image forming device as a present image forming device and at least one other image forming device of said plurality of image forming devices can be selected as a destination device for formation of an image read by said reading unit of the present, the method comprising the steps of:

displaying a destination device designating screen for designating the destination device on a display unit of each of the present image forming device and the other image forming device, a list of device names given respectively to the present image forming device and the other image forming device being displayed on the destination device designating screen;

selecting one of the present image forming device and the other image forming device corresponding to a device name designated according to an inputting operation by a user on the destination device designating screen, as the destination device;

transmitting the image read by said reading unit of the present image forming device through said communication media from the present image forming device to the other image forming device, when the other image forming device is selected as the destination device; and inputting the image read by said reading unit of the present image forming device to the present image forming device, when the present image forming device is selected as the destination device.

26. A method of controlling an image forming system which includes a plurality of image forming devices being connectable to one another, the method comprising the steps of:

selecting one of an image forming device as a present image forming device and at least one other image forming device of the plurality of image forming devices as a destination device for formation of an image inputted by the present image forming device, according to an inputting operation by a user;

selecting a sheet size used for the formation of the image inputted by the present image forming device, according to an inputting operation by the user;

inhibiting a sheet size, which cannot be provided by the image forming device selected as the destination device, from being selected as the sheet size used for the formation of the image inputted by the present image forming device; and inhibiting an image forming device, which cannot provide the selected sheet size, from being selected as the destination device.

* * * * *